(12) United States Patent
Asai et al.

(10) Patent No.: US 8,329,479 B2
(45) Date of Patent: Dec. 11, 2012

(54) INFORMATION MANAGING METHOD, INFORMATION MANAGING APPARATUS AND SUBSTRATE PROCESSING SYSTEM

(75) Inventors: Kazuhide Asai, Toyama (JP); Hiroyuki Iwakura, Toyama (JP); Toshiro Koshimaki, Himishi (JP); Kayoko Yashiki, Imizushi (JP)

(73) Assignee: Hitachi Kokusai Electrical Inc., Tokyo (JP)

( * ) Notice: Subject to any disclaimer, the term of this patent is extended or adjusted under 35 U.S.C. 154(b) by 674 days.

(21) Appl. No.: 12/423,582

(22) Filed: Apr. 14, 2009

(65) Prior Publication Data
US 2009/0265322 A1    Oct. 22, 2009

(30) Foreign Application Priority Data

Apr. 18, 2008  (JP) .................................. 2008-109154
Jul. 15, 2008  (JP) .................................. 2008-183573

(51) Int. Cl.
*H01L 21/00*    (2006.01)
(52) U.S. Cl. ......................................... 438/10; 707/676
(58) Field of Classification Search .......... 707/673–682; 355/53–55; 438/6–11
See application file for complete search history.

(56) References Cited

U.S. PATENT DOCUMENTS

| | | | |
|---|---|---|---|
| 6,445,908 B1 * | 9/2002 | Glazko | 455/255 |
| 6,941,230 B1 * | 9/2005 | Stirnberg et al. | 702/28 |
| 2002/0171815 A1 * | 11/2002 | Matsuyama et al. | 355/55 |
| 2006/0149974 A1 * | 7/2006 | Rotem et al. | 713/300 |
| 2007/0052939 A1 * | 3/2007 | Ishii et al. | 355/53 |
| 2008/0086229 A1 * | 4/2008 | Ueda et al. | 700/121 |
| 2008/0182345 A1 * | 7/2008 | Sugishita et al. | 438/7 |

FOREIGN PATENT DOCUMENTS
JP    02-292641    4/1990

* cited by examiner

*Primary Examiner* — Wilson Lee
(74) *Attorney, Agent, or Firm* — Brundidge & Stanger, P.C.

(57) ABSTRACT

An information managing method for managing information, based upon an electronic message containing apparatus information or event information transmitted from a substrate processing apparatus, comprises: storing the apparatus information of the substrate processing apparatus at the transmission time of the electronic message containing the apparatus information in a first apparatus information storage unit; when the electronic message containing the event information is transmitted, comparing conditions for accumulating the event information and the apparatus information; and when the conditions coincide with each other, storing the apparatus information in a second apparatus information storage unit in association with time when the event information has been generated.

6 Claims, 23 Drawing Sheets

| TIME | APPARATUS NAME | TYPE OF ITEM | MEASURED VALUE |
|---|---|---|---|
| 12:00:00 | APPARATUS A | TEMPERATURE CH1 | 700.0 |
| 12:00:01 | APPARATUS B | TEMPERATURE CH1 | 710.0 |
| 12:00:02 | APPARATUS B | TEMPERATURE CH2 | 800.0 |
| 12:00:02 | APPARATUS A | GAS CH1 | 1.2 |
| 12:00:02 | APPARATUS A | TEMPERATURE CH2 | 720.0 |
| 12:00:03 | APPARATUS C | PRESSURE CH1 | 0.234 |
| 12:00:03 | APPARATUS A | TEMPERATURE CH1 | 700.0 |
| 12:00:04 | APPARATUS B | GAS CH3 | 2.3 |
| 12:00:04 | APPARATUS A | TEMPERATURE CH1 | 690.0 |
| 12:00:04 | APPARATUS B | GAS CH7 | 2.3 |
| ⋮ | ⋮ | ⋮ | ⋮ |

Fig. 1C

| TIME | TEMPERATURE CH1 | TEMPERATURE CH2 | GAS CH1 | |
|---|---|---|---|---|
| 12:00:00 | | | | |
| 12:00:01 | 710.0 | | | |
| 12:00:02 | | 720.0 | 1.2 | |
| 12:00:03 | 700.0 | | | |
| 12:00:04 | 690.0 | | | |
| 12:00:05 | | | | |
| ⋮ | ⋮ | ⋮ | ⋮ | ⋮ |

Fig. 10A

```
FAILURE INFORMATION SCREEN

CONTENTS  [                    ]
        OF FAILURE

▪ APPARATUS INFORMATION
             IN OCCURRENCE OF FAILURE

GAS CH1        [    2.3    ]

TEMPERATURE CH1 :   [   720.5   ]

TEMPERATURE CH2 :   [   735.0   ]
```

Fig. 10B

```
FAILURE INFORMATION SCREEN

CONTENTS  [                    ]
        OF FAILURE

▪ APPARATUS INFORMATION
             IN OCCURRENCE OF FAILURE

GAS CH1        [    2.3    ]

TEMPERATURE CH1 :   [   720.5   ]

TEMPERATURE CH2 :   [  (BLANK)  ]
```

INFORMATION MANAGING METHOD, INFORMATION MANAGING APPARATUS AND SUBSTRATE PROCESSING SYSTEM

BACKGROUND OF THE INVENTION

1. Field of the Invention

The present invention relates to information managing apparatus and method for managing information transmitted from a substrate processing apparatus which processes a semiconductor substrate or a glass substrate, a substrate processing system including a substrate processing apparatus and an information managing apparatus, a method for displaying information stored in the information managing apparatus, and a substrate processing system including the information.

2. Description of the Prior Art

Generally, a substrate processing system includes a plurality of substrate processing apparatuses for processing substrates, and a group management server (information managing apparatus) for monitoring operational states of the plurality of substrate processing apparatuses and managing information (data) such as production history. Accordingly, the information managing apparatus manages a variety of information, such as the measured values of temperature, pressure and gas, or operational states, which are transmitted from the substrate processing apparatuses. Such an information managing apparatus contributes to improvement in the efficiency of semiconductor production. By using a terminal device, a user acquires the information managed by the information managing apparatus.

However, in a conventional substrate processing system, time is required for the terminal device to acquire information from the information managing apparatus.

SUMMARY OF THE INVENTION

To solve the above problems, an object of the present invention is to reduce time taken for a terminal device to acquire information from an information managing apparatus.

According to a feature of the present invention, there is provided an information managing method for managing information, based upon an electronic message containing apparatus information or event information transmitted from a substrate processing apparatus, the information managing method comprising: storing the apparatus information of the substrate processing apparatus at the transmission time of the electronic message containing the apparatus information in a first apparatus information storage unit; when the electronic message containing the event information is transmitted, comparing conditions for accumulating the event information and the apparatus information; and when the conditions coincide with each other, storing the apparatus information in a second apparatus information storage unit in association with time when the event information has been generated.

According to another feature of the present invention, there is provided an information displaying method for displaying information on a manipulation terminal having a manipulation screen, wherein when an electronic message containing event information is transmitted from a substrate processing apparatus, the manipulation terminal searches a second apparatus information storage unit storing a set moving target apparatus information to which a generation time of the event information is added, by referring to the moving condition for moving the event information and apparatus information stored in a first apparatus information storage unit to the second apparatus information storage unit and a condition storage unit in which the apparatus information being a moving target is set; the manipulation terminal compares the search result information with the set apparatus information; and when the search result information coincides with the set apparatus information, the apparatus information is displayed on the manipulation screen.

According to another feature of the present invention, there is provided an information managing apparatus comprising: a first apparatus information storage unit storing apparatus information of a substrate processing apparatus based on an electronic message transmitted from the substrate processing apparatus for processing a substrate, the electronic message including at least one of the apparatus information and event information; a second apparatus information storage unit storing the apparatus information in association with a time stamp when the apparatus information or the event information is generated; a condition storage unit storing an accumulation condition for accumulating the apparatus information in the second apparatus information storage unit and the apparatus information to be accumulated; and a registration unit registering the apparatus information to be accumulated and the time stamp thereof associated with the apparatus information to be accumulated in the second apparatus information storage unit when the accumulation condition stored in the condition storage unit is satisfied.

According to another feature of the present invention, there is provided a substrate processing system comprising: a plurality of substrate processing apparatuses; and an information managing apparatus processing an electronic message including at least one of the apparatus information and event information transmitted from the plurality of substrate processing apparatuses, wherein the substrate processing apparatus comprises a transmission unit transmitting the electronic message to the information managing apparatus, and the information managing apparatus comprises: a first apparatus information storage unit storing the apparatus information based on the electronic message; a second apparatus information storage unit storing the apparatus information in association with a time stamp when the apparatus information or the event information is generated; a condition storage unit storing an accumulation condition for accumulating the apparatus information in the second apparatus information storage unit and the apparatus information to be accumulated; and a registration unit registering the apparatus information to be accumulated and the time stamp thereof associated with the apparatus information to be accumulated in the second apparatus information storage unit when the accumulation condition stored in the condition storage unit is satisfied.

According to another feature of the present invention, there is provided a substrate processing system comprising: a plurality of substrate processing apparatuses; an information managing apparatus processing an electronic message transmitted from the substrate processing apparatuses; and a terminal device connected to the information managing apparatus, wherein the substrate processing apparatus comprises a transmission unit transmitting the electronic message containing apparatus information or event information to the information managing apparatus, the information managing apparatus comprises: a first apparatus information storage unit storing the apparatus information of the substrate processing apparatus at a transmission time of the electronic message, based upon the electronic message transmitted from the transmission unit; a second apparatus information storage unit storing the apparatus information in association with time; a condition storage unit storing conditions for setting the moving apparatus information and accumulating the apparatus information; and a registration unit registering time when the conditions stored in the condition storage unit are satisfied in the second apparatus information storage unit, in association with the apparatus information coinciding with the setting stored in the first apparatus information storage unit, and the terminal device comprises a search unit searching the apparatus information stored in the second apparatus information storage unit.

According to another feature of the present invention, there is provided a substrate processing apparatus of the above-described substrate processing system.

BRIEF DESCRIPTION OF THE DRAWINGS

FIG. 1A to FIG. 1C show apparatus information stored in a conventional group management server and its structure, and a method for acquiring the stored apparatus information.

FIG. 8A is an exemplary view of the current information storage unit 402, and FIG. 8B is an exemplary view of the apparatus information DB 400.

FIG. 10A and FIG. 10B are exemplary views of a failure information screen displayed on a terminal device 6.

DETAILED DESCRIPTION OF THE PREFERRED EMBODIMENTS

First, the background of the invention will be explained with reference to FIG. 1A to FIG. 1C.

Figures 1A, 1B:
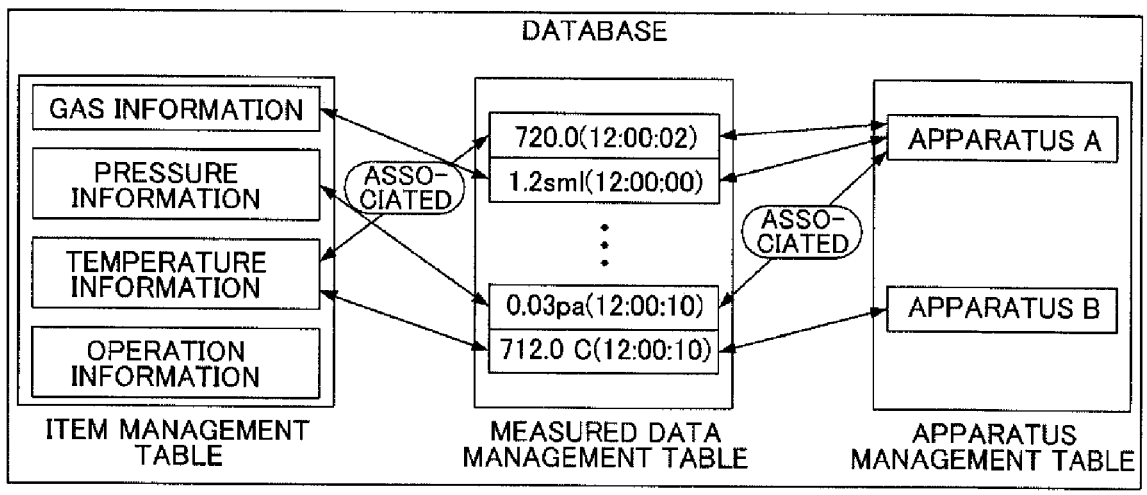

FIG. 1A to FIG. 1C show apparatus information stored in a conventional group management server and its structure, and a method for searching the stored apparatus information.

FIG. 1A exemplarily shows an electronic message transmitted from a substrate processing apparatus. As exemplified in FIG. 1A, each electronic message contains a transmission time, a substrate processing apparatus name (apparatus name) of a transmission source, type of item, and item information (measured values or the like). The group management server receives messages transmitted from a plurality of substrate processing apparatuses, acquires apparatus information from the received messages, and stores the acquired apparatus information.

FIG. 1B schematically shows the storage structure of the apparatus information. As shown in FIG. 1B, the apparatus information is stored in a database (DB). The DB contains an item management table, a measured data management table, and an apparatus management table. The item management table manages items corresponding to the item type. The apparatus management table manages the substrate processing apparatuses. The measured data management table manages the items managed in the item management table, the information (measured values or the like) associated with the apparatuses managed in the apparatus management table, and the timing (corresponding to the 'time' of FIG. 1A) contained in the message.

Such a DB structure has the following merits: 1) even though an item is added, there is no influence on the DB structure (for example, a new table need not be added); 2) even though another substrate processing apparatus is added, there is no influence on the DB structure; 3) when the substrate processing apparatuses contain different items, its apparatus information is managed in the measured data management table; and 4) the measured data management table stores only the information about the items contained in the substrate processing apparatuses (measured values or the like), and thus, unnecessary data region does not exist.

FIG. 1C shows a method for acquiring the apparatus information stored in the DB. For example, when checking a state of a substrate processing apparatus (failed apparatus) at the time when failure has occurred, a terminal device as a manipulation terminal refers to the item management table, the measured data management table and the apparatus management table of the DB and reconfigures the three tables into a table exemplified in FIG. 1C. In the table of FIG. 1C, the measured value of each item for the failed apparatus at each time is searched. Since the measured values of all items for each time are not considered to be stored, if the measured value for a desired time is not stored, it is necessary to go back to the time when the measured value has been stored.

Specifically, the terminal device needs to compensate the measured value from the desired time to the time when the measured value has been stored. For example, while the terminal device can search a value (690.0) of a temperature ch1 at the time of 12:00:04, the terminal device cannot search a value of a temperature ch2 and a value of a gas ch1, and it needs to retroact to the time of 12:00:02 in order to search the value of the temperature ch2 and the value of the gas ch1.

As mentioned above, such a DB structure has the following demerits: 1) it takes time to reconfigure the plurality of tables associated together into a single table for data searching; and 2) it takes time to interpolate the measured values.

Hereinafter, based on the aforementioned background, the substrate processing system relevant to embodiments of the present invention will be described.

Figure 2:
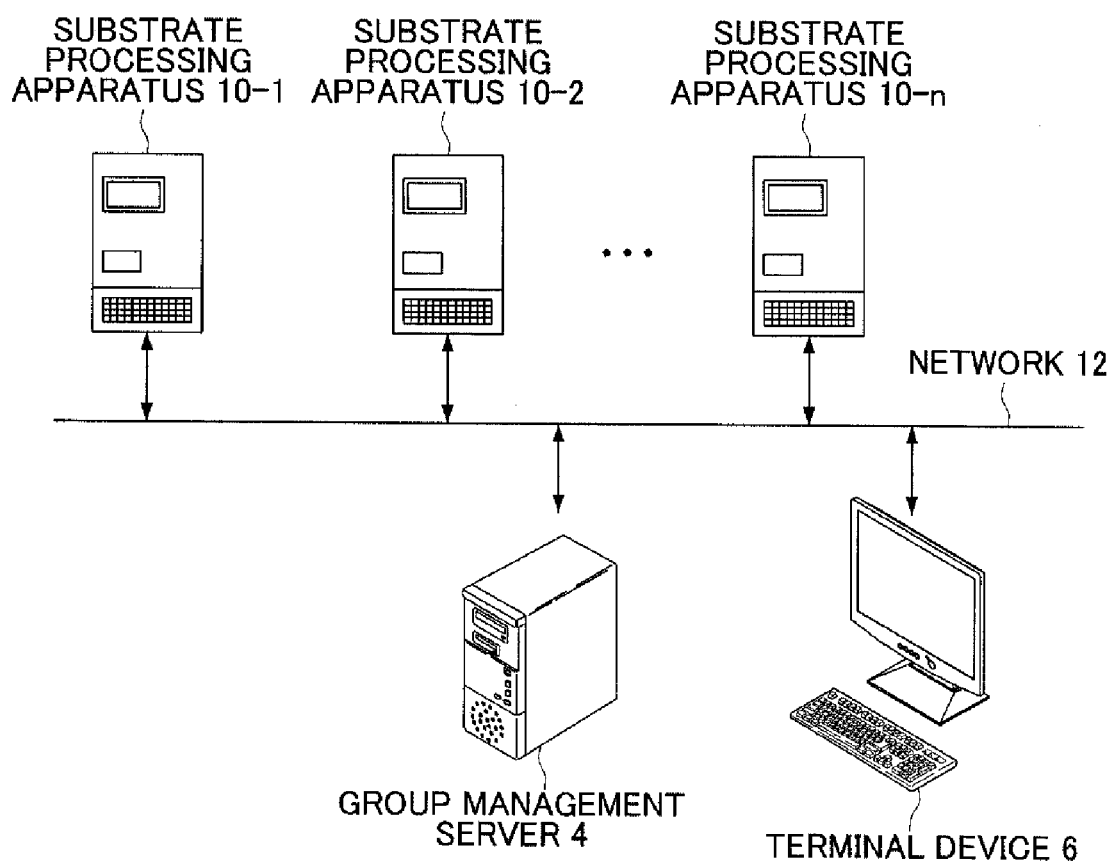
FIG. 2 shows the structure of a substrate processing system 1 relevant to the embodiment of the present invention.

FIG. 2 shows the structure of the substrate processing system 1 relevant to the embodiment of the present invention.

As shown in FIG. 2, the substrate processing system 1 includes a plurality of substrate processing apparatuses 10-1 to 10-n, a group management server 4, and a terminal device 6. The substrate processing apparatuses 10-1 to 10-n, the group management server 4 and the terminal device 6 are connected together so that information is transmitted and received through a network 12, such as a Local Area Network (LAN), a Wide Area Network (WAN) or the like. When the plurality of components, for example, the substrate processing apparatuses 10-1 to 10-n are denoted without specifying one of them, they are simply referred to as the substrate processing apparatus 10.

The substrate processing apparatus 10 performs the substrate processing, based on a process recipe or the like. Specifically, the process recipe stores the sequence of processing the substrate, and the substrate processing apparatus 10 controls its internal components, based on the stored sequence. Furthermore, the substrate processing apparatus 10 transmits the electronic message, which contains the information about the processing of the substrate processing apparatus 10 (hereinafter, referred to as "apparatus information") containing the production information, such as temperature information, pressure information and gas information, to the group management server 4 through the network 12. Moreover, the substrate processing apparatus 10 may transmit, to the group management server 4, the electronic message containing information having a low occurrence frequency or information occurring abruptly (hereinafter, referred to as "event information"), such as information indicating occurrence of failure (error information) or information indicating a predetermined operation during the substrate processing (operation information).

As one example, in the fabrication method of a semiconductor device (IC), the substrate processing apparatus 10 is configured as a semiconductor manufacturing apparatus performing a processing apparatus. The following explanation will be given on the substrate processing apparatus 10 in accordance with an embodiment of the present invention, to which a vertical type apparatus performing an oxidation process, a diffusion process or a CVD process on a substrate is applied.

The detailed structure of the substrate processing apparatus 10 will be described later.

The group management server (information managing apparatus) 4 receives the electronic message transmitted from the substrate processing apparatus 10, and stores and manages the apparatus information or an event information contained in the electronic message. Furthermore, the group management server 4 may be configured to include a plurality of databases (DB). The function of the group management server 4 and the DB structure will be described later in detail.

The terminal device 6 constitutes an interface which searches the information accumulated by the group management server 4, displays the search result, and provides the information to the user. More specifically, the terminal device 6 receives a user's request through a keyboard or a mouse, acquires the information from the group management server 4, and displays the acquired information on a screen. The terminal device 6 need not be disposed in a location (for example, a clean room) where the substrate processing apparatus is arranged. For example, the terminal device 6 may be disposed at a location (for example, an office) other than the location where the substrate processing apparatus 10 is arranged.

Next, the detailed structure of the substrate processing apparatus 10 will be described.

Figure 3:
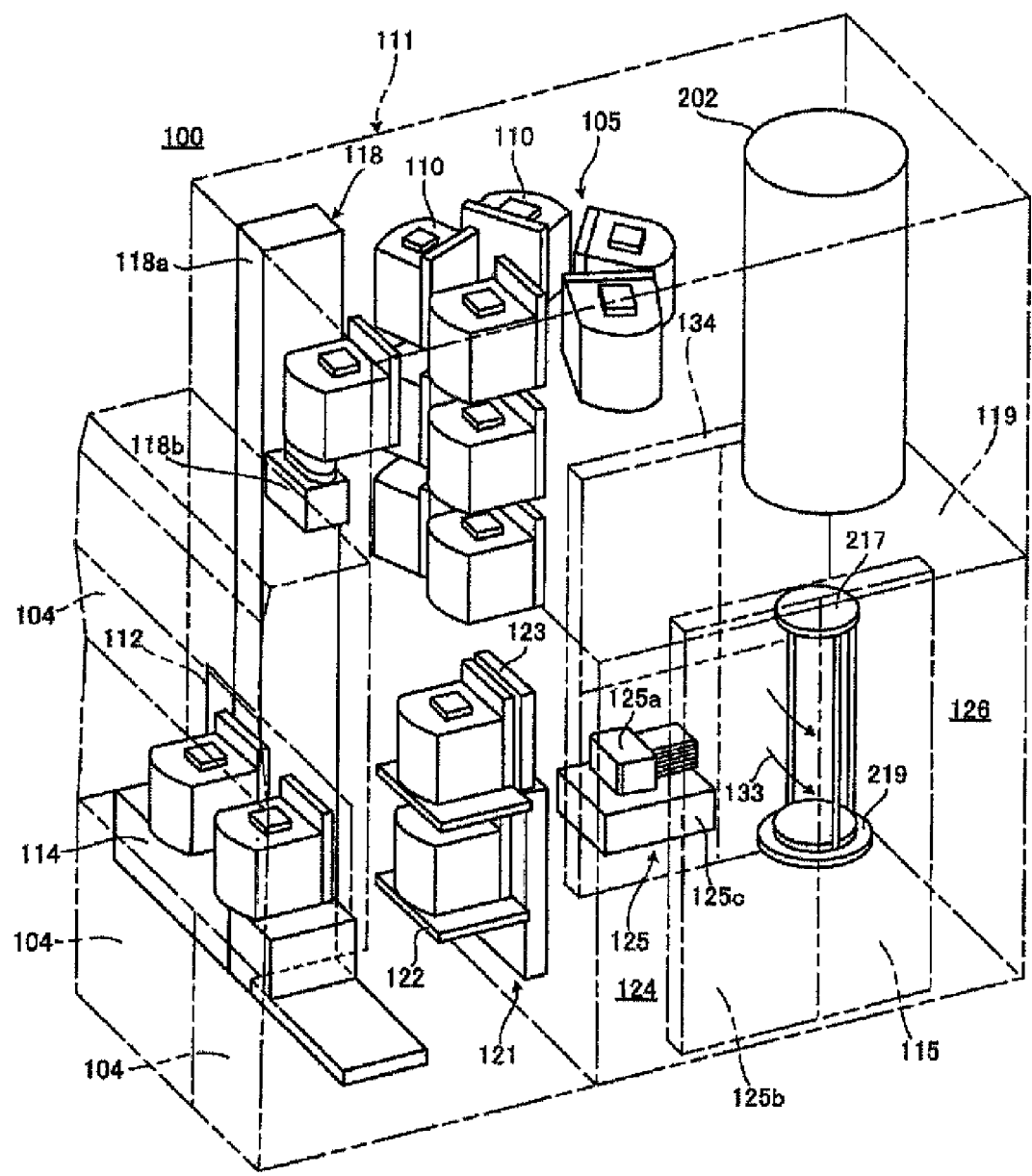
FIG. 3 is a perspective view of a substrate processing apparatus 10 relevant to the embodiment of the present invention.

FIG. 3 is a perspective view of the substrate processing apparatus 10 relevant to the embodiment of the present invention. Also, FIG. 4 is a side perspective view of the substrate processing apparatus 10 relevant to the embodiment of the present invention.

Figure 4:
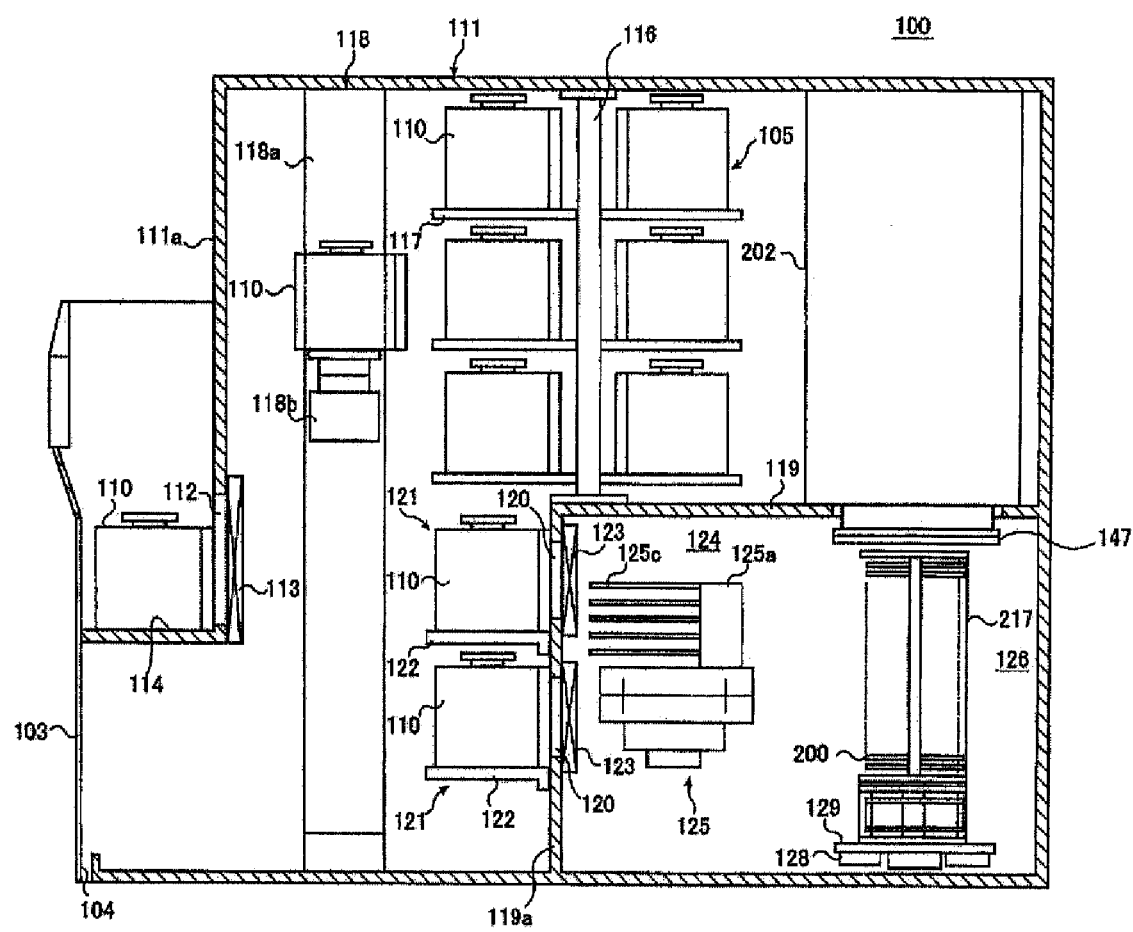
FIG. 4 is a side perspective view of the substrate processing apparatus 10 relevant to the embodiment of the present invention.

As shown in FIG. 3 and FIG. 4, the substrate processing apparatus 10 in accordance with the embodiment of the present invention is provided with a housing 111. In the substrate processing apparatus 10, a Front Opening Unified Pod (FOUP, substrate container, hereinafter, referred to as a pod) 110 is used as a wafer carrier accommodating wafers (substrates) 200 made of silicon or the like. At the front forward part of a front wall 111a of the housing 111, front maintenance gates 103 are formed as opening parts for maintenance, and front maintenance doors 104 are installed to open and close the front maintenance gates 103, respectively.

At the front wall 111a of the housing 111, a pod carrying in/out opening (substrate container carrying in/out opening) 112 is provided in communication with the inside and outside of the housing 111, and the pod carrying in/out opening 112 is designed to be opened and closed by a front shutter (mechanism for opening and closing the substrate container carrying in/out opening) 113. At the front forward side of the pod carrying in/out opening 112, a load port (substrate container delivery table) 114 is installed, and the pod 110 is placed on the load port 114 and then aligned. The pod 110 is designed to be carried onto/out of the load port 114 by an in-plant carrying device (not shown).

At an approximately upper center part of the housing 111 in a front and rear direction, a rotatable pod shelf (substrate container placement shelf) 105 is installed, and the rotatable pod shelf 105 is designed to accommodate a plurality of pods 110. That is, the rotatable pod shelf 105 includes a post 116 and a plurality of shelf plates (substrate container placement table) 117. The post 116 is erected and rotates intermittently within a horizontal plane, and the plurality of shelf plates 117 are respectively disposed at the upper middle and lower stages of the post 116 and are supported radially. The plurality of shelf plates 117 are configured to hold the plurality of pods 110 placed thereon, respectively.

At the inside of the housing 111, a pod carrying device (substrate container carrying device) 118 is installed between the load port 114 and the rotatable pod shelf 105. The pod carrying device 118 is configured by a pod elevator (substrate container elevating mechanism) 118a, which can move upward and downward while holding the pod 110, and a pod carrying mechanism (substrate container carrying mechanism) 118b as a carrying mechanism. The pod carrying device 118 is designed to carry the pod 110 among the load port 114, the rotatable pod shelf 115 and a pod opener (substrate container cap opening/closing mechanism) 121 by the continuous operations of the pod elevator 118a and the pod carrying mechanism 118b.

At an approximately lower center part of the housing 111 in a front and rear direction, a sub housing 119 is installed at over the rear end. At a front wall 119a of the sub housing 119, a pair of wafer carrying in/out openings (substrate carrying in/out openings) 120 are vertically arranged in upper and lower stages in order to carry the wafer 200 in/out of the sub housing 119. A pair of pod openers 121 are installed at the upper and lower wafer carrying in/out openings 120, respectively. Each of the pod openers 121 includes a placement table 122 on which the pod 110 is placed, and a cap attaching/detaching mechanism (cover attaching/detaching mechanism) 123 which attaches and detaches a cap of the pod 110. The pod opener 121 is configured to open and close a wafer entrance/exit port of the pod 110 by attaching and detaching the cap of the pod 110 placed on the placement table 122 by using the cap detaching/attaching mechanism 123.

The sub housing 119 constitutes a transfer chamber 124 fluidically isolated from an installation space of the pod carrying device 118 or the rotatable pod shelf 105. A wafer transfer mechanism (substrate transfer mechanism) 125 is installed in a front area of the transfer chamber 124. The wafer transfer mechanism 125 is configured by a wafer transfer device (substrate transfer device) 125a capable of rotating or directly moving the wafer 200 in a transverse direction, and a wafer transfer device elevator (substrate transfer device elevating mechanism) 125b for moving the wafer transfer device 125a upward and downward. As schematically shown in FIG. 4, the wafer transfer device elevator 125b is installed between a right end of a pressure-resistant housing 111 and a front right end of the transfer chamber 124 of the sub housing 119. By the continuous operations of the wafer transfer device elevator 125b and the wafer transfer device 125a, the wafer 200 is charged/discharged into/from a boat (substrate holding tool) 217 by using tweezers (substrate holder) 125c of the wafer transfer device 125a as a placement part of the wafer 200.

In a rear area of the transfer chamber 124, a standby part 126 is installed to accommodate the boat 217 in the standby state. Over the standby part 126, a process chamber 202 is installed. A lower end of the process chamber 202 is configured to be opened and closed by a furnace port shutter (furnace port opening/closing mechanism) 147.

As schematically shown in FIG. 3, a boat elevator (substrate holding tool elevating mechanism) 115 for moving the boat 217 upward and downward is installed between a right end of the pressure-resistant housing 111 and a right end of the standby part 126 of the sub housing 119. A seal cap 219 as a cover is transversely installed in arms 128 serving as a connecting tool connected to an elevating table of the boat elevator 115. The seal cap 219 is configured to support the boat 217 vertically and close the lower end of the process chamber 202. The boat 217 includes a plurality of holding members and is configured to hold a plurality of sheets (for example, from about 50 to 150 sheets) of wafers 200 at a horizontal position, with their centers aligned vertically.

As schematically shown in FIG. 3, at a left end of the transfer chamber 124, opposite to the wafer transfer device elevator 125b and the boat elevator 115, a clean unit 134 including a supply fan and a dust-proof filter is installed to supply clean air 133 that is a purified atmosphere or inert gas. Although not shown, a notch aligner 135 as a substrate aligner for aligning the wafers in a circumferential direction is installed between the wafer transfer device 125a and the clean unit 134.

The clean air 133 supplied from the clean unit 134 is circulated through the notch aligner 135, the wafer transfer device 125a, and the boat 217 placed in the standby part 126. Thereafter, the clean air 133 is sucked by a duct (not shown) and exhausted to the outside of the housing 111, or is circulated to a first side (supply side) being a suction side of the clean unit 134 and then is supplied into the transfer chamber 124 again by the clean unit 134.

Next, explanation will be given on a process module controller (PMC) 14 installed in the inside of the substrate processing apparatus 10 and configured to control the respective components of the substrate processing apparatus 10.

Figure 5:
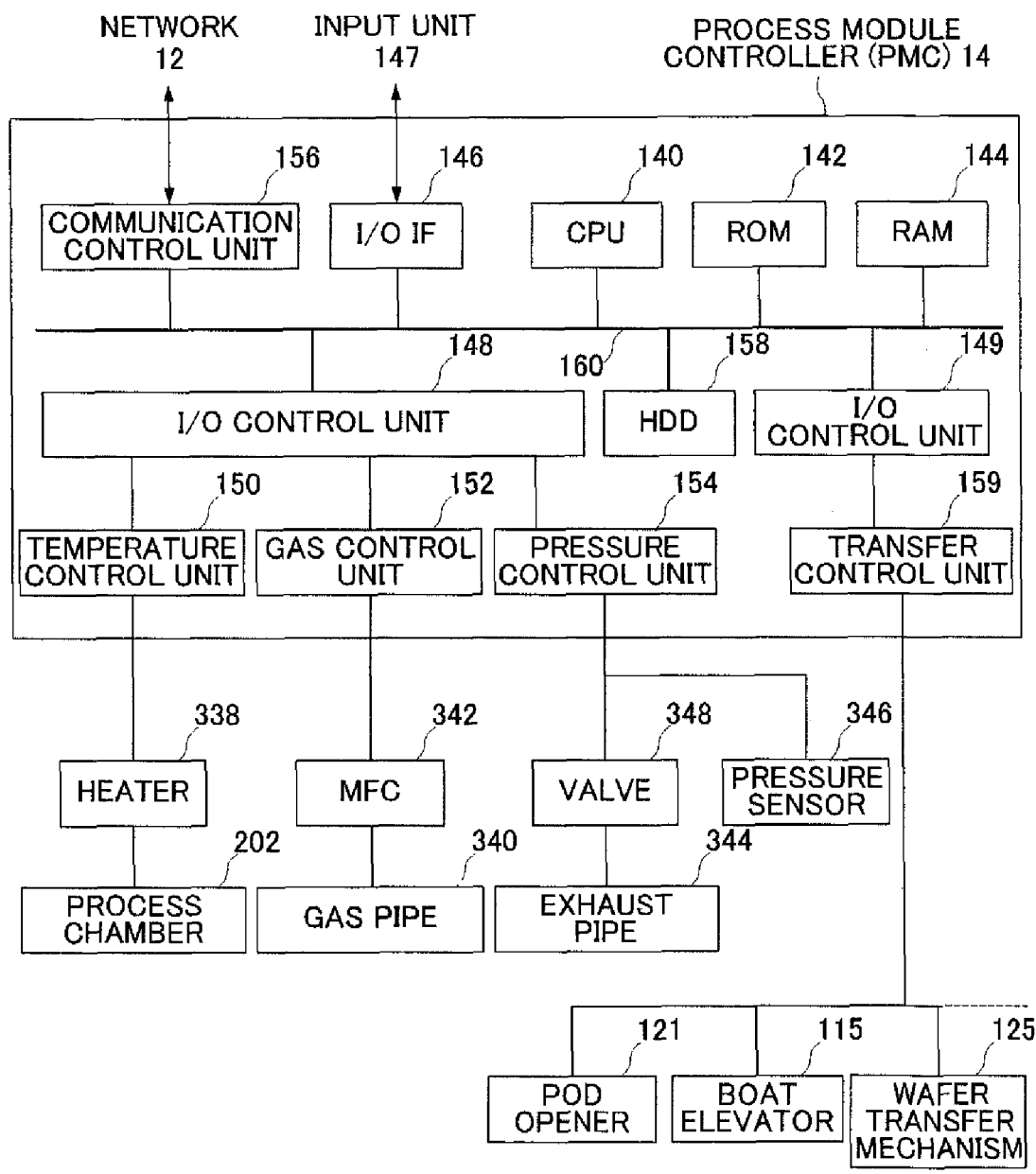
FIG. 5 shows a functional structure view of the substrate processing apparatus 10, focused on a PMC 14.

FIG. 5 shows a functional structure view of the substrate processing apparatus 10, focused on the PMC 14.

As shown in FIG. 5, the PMC 14 includes a central processing unit (CPU) 140, a read only memory (ROM) 142, a random access memory (RAM) 144, a hard disk drive (HDD) 158 storing information, an I/O interface (IF) 146 configured to transmit and receive information between a display device (not shown) such as a display and an input unit (not shown) such as a keyboard, a communication control unit 156 configured to control information communication with the group management server 4 or the like through the network 12, a temperature control unit 150, a gas control unit 152, a pressure control unit 154, and an I/O control unit 148 configured to perform I/O control of the temperature control unit 150 or the like. Those components are connected together through a bus 160, and information is inputted and outputted between those components through the bus 160.

In the PMC 14, the CPU 140 processes the substrate, based upon a predetermined recipe. Specifically, the CPU 140 outputs control information (control instruction) to the temperature control unit 150, the gas control unit 152, the pressure control unit 154, or the like. The ROM 142, the RAM 144 and the HDD 158 store the sequence program, the information inputted from the I/O IF 146, and the information inputted through the communication control unit 156.

The temperature control unit 150 controls the internal temperature of the process chamber 202 by using a heater 338 installed in an outer periphery of the process chamber 202. The gas control unit 152 controls a supply amount of reaction gas supplied into the process chamber 202, based upon an output value from a mass flow controller (MFC) 342 installed in a gas pipe 340 of the process chamber 202. The pressure control unit 154 controls the internal pressure of the process chamber 202 by opening and closing a valve 348, based upon an output value from a pressure sensor 346 installed in an exhaust pipe 344 of the process chamber 202. A transfer control unit 159 controls the pod opener 121, the boat elevator 115, and the transfer system such as the wafer transfer mechanism. In this way, the temperature control unit 150 or the like controls the respective components (the heater 338, the MFC 342 and the valve 348) of the substrate processing apparatus 10, based upon the control instruction from the CPU 140.

Accordingly, the CPU 140 runs the sequence program, sequentially performs the steps in which target values of control parameters are set, by calling and executing commands of the recipe according to the sequence program, and transmits the substrate processing control instruction to the temperature control unit 150, the gas control unit 152, the pressure control unit 154, and the transfer control unit 159 through the I/O control unit 148. The temperature control unit 150 or the like controls the respective components (the heater 338, the MFC 342 and the valve 348) of the substrate processing apparatus 10, based upon the control instruction. In this way, the processing of the wafer 200 is achieved.

The CPU 140 (transmitter) transmits the electronic message to the group management server 4 through the communication control unit 156, wherein the electronic message contains the event information or the apparatus information of the substrate processing apparatus 10, including the production information such as temperature information, pressure information, gas information or the like. For example, when any one of the production information is changed, the CPU 140 transmits an electronic message containing the apparatus information in which the changed information is reflected. Furthermore, the CPU 140 transmits the electronic message containing information about the event and failure of the substrate processing apparatus 10 (event information) to the group management server 4. For example, the event occurs when the boat 217 starts to move up, or finishes moving up, or starts to move down, or finishes moving down. If such an event occurs, the on/off state of a position sensor of the boat elevator 115 is switched and a switching signal is transmitted.

Figure 6:
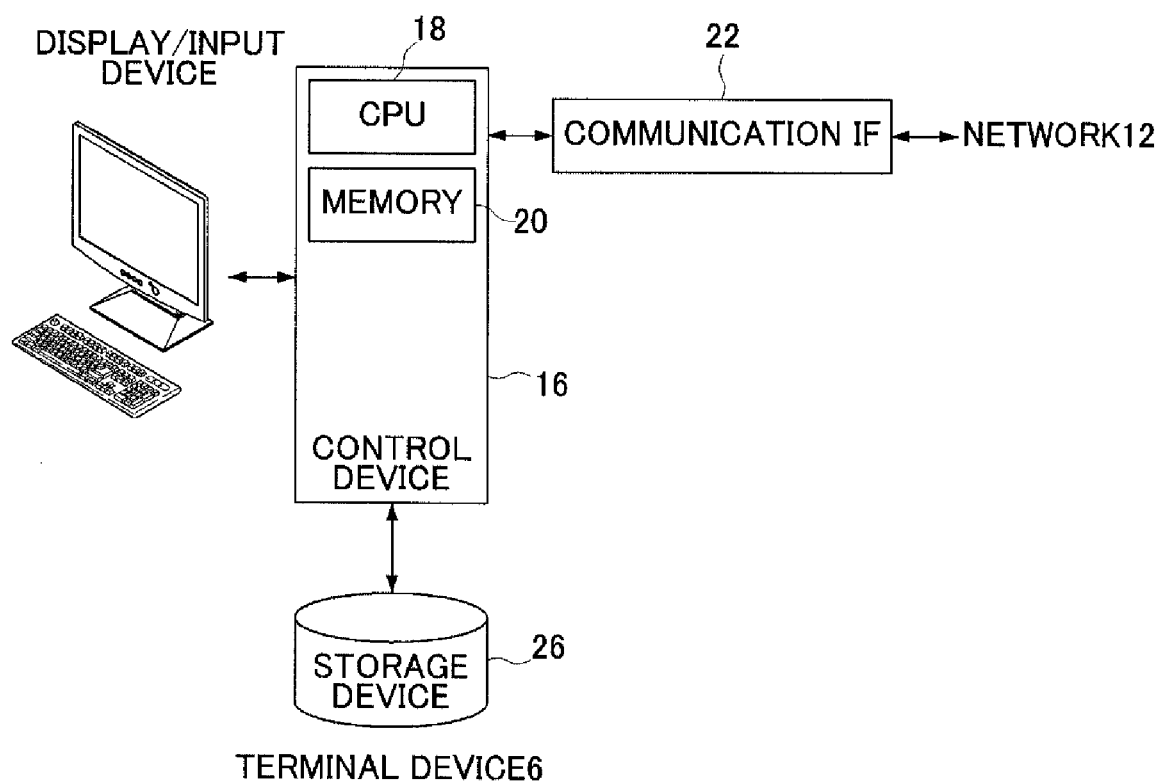
FIG. 6 shows a hardware structure view of a terminal device 6, focused on a control device 16.

FIG. 6 shows a hardware structure view of the terminal device 6, focused on the control device 16.

As shown in FIG. 6, the terminal device 6 includes a control device 16 having a CPU 18 and a memory 20, a communication interface (IF) 22 configured to transmit and receive information to/from an external computer through a network 12, a storage device 26 such as a hard disk drive, and a display/input device 24 having a display device such as a liquid crystal display and a pointing device such as a mouse. In this way, the terminal device 6 is implemented as a general-purpose computer such as a personal computer. The group management server 4 includes the control device 16, the communication IF 22, and the storage device 26. Furthermore, the group management server 4 is designed to be connected to the display/input device 24 of the terminal device 6 through the communication IF 22.

Next, explanation will be given on the function of the group management server 4, the DB structure, and the function of the terminal device 6.

Figure 7:
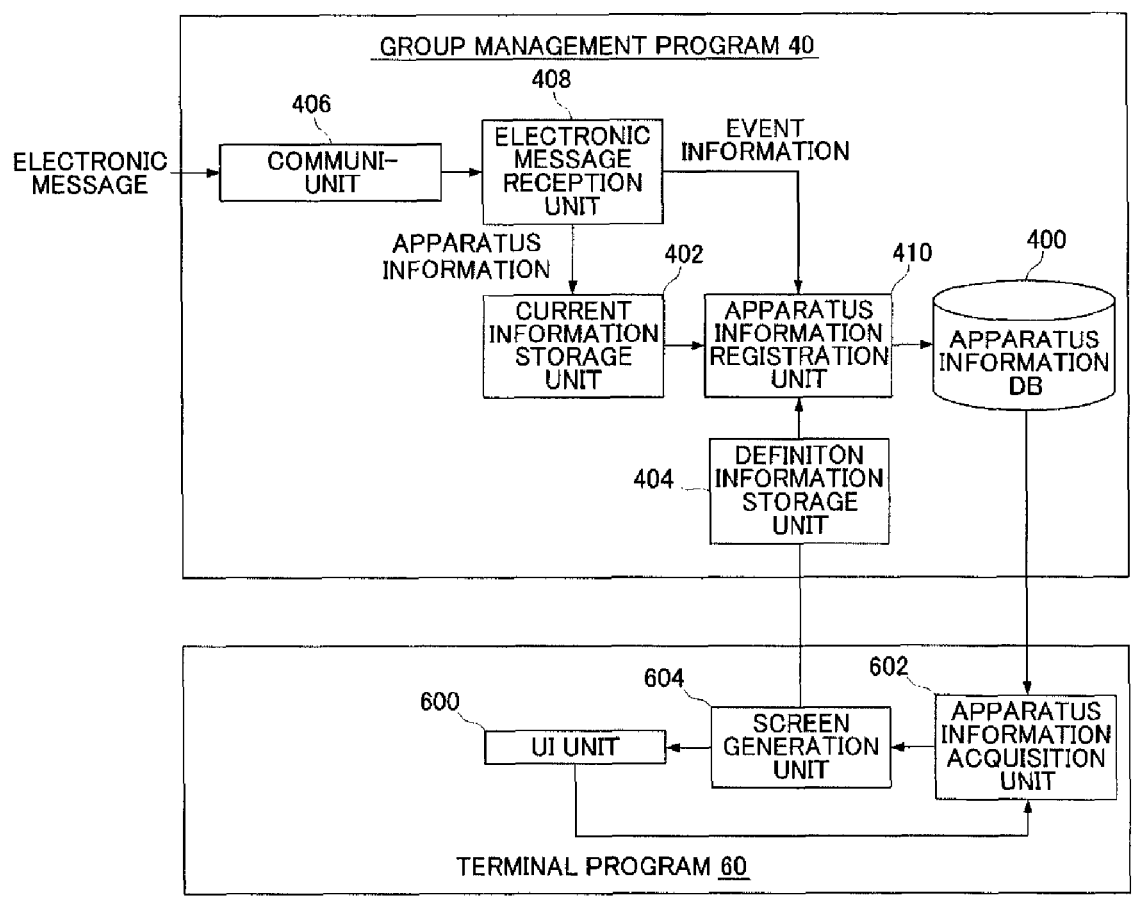
FIG. 7 shows the functional structures of a group management program 40 executed by a group management server 4, and a terminal program 60 executed by a terminal device 6.

FIG. 7 shows a functional structure view of a group management program 40 executed by the group management server 4, and a terminal program 60 executed by the terminal device 6.

As shown in FIG. 7, the group management program 40 includes an apparatus information DB 400, a current information storage unit 402, a definition information storage unit 404, a communication unit 406, an electronic message reception unit 408, and an apparatus information registration unit 410. The group management program 40 is loaded into the memory 20 of the group management server 4 and is executed on an operating system (OS) (not shown) running on the control device 16.

In the group management program 40, the current information storage unit 402 (first apparatus information storage unit) stores latest apparatus information of each substrate processing apparatus 10. Specifically, the current information storage unit 402 stores the apparatus information at the time when the electronic message is transmitted, based upon the electronic message transmitted from the substrate processing apparatus 10. The apparatus information contains production information, such as apparatus identification information, temperature information, pressure information, gas information or the like, and measured value for each production information. The current information storage unit 402 (first apparatus information storage unit) stores the measured values with respect to all apparatus information of each substrate processing apparatus 10 acquired from the electronic message. The current information storage unit 402 is implemented with the memory 20.

The apparatus information DB 400 (second apparatus information storage unit) stores the apparatus information of each substrate processing apparatus 10 in association with time. Specifically, the apparatus information DB 400 stores the apparatus information defined by the definition information storage unit 404 to be described later as a part of the apparatus information, at each time when the defined event information is generated. The apparatus information DB 400 is implemented with at least one of the memory 20 and the storage device 26. The structure of the apparatus information stored in the apparatus information DB 400 and the current information storage unit 402 will be described later.

The definition information storage unit 404 stores the definition information in a changeable form. The apparatus information stored in the current information storage unit 402 is read, and condition (accumulation condition) accumulated in the apparatus information DB 400 and the apparatus information to be displayed on the terminal device 6 are contained in the definition information. For example, the accumulation condition contains the generation of a predetermined event. Furthermore, for example, the apparatus information to be displayed on the terminal device 6 contains types of the production information, such as "temperature ch1," "temperature ch2," and "gas ch1," and the measured value of each production information. The definition information storage unit 404 may store a plurality of definition information. In this case, it is preferable that the group management program 40 should have the apparatus information DB 400 for each definition information.

The communication unit 406 performs a communication process for communication with the substrate processing apparatus 10. Specifically, the communication unit 406 acquires the electronic message transmitted from the substrate processing apparatus 10 through the communication IF 22 in a predetermined sequence, and outputs to the electronic message reception unit 408.

The electronic message reception unit 408 receives the electronic message outputted from the communication unit 406, and stores the apparatus information in the current information storage unit 402 if the electronic message contains the apparatus information. Specifically, the electronic message reception unit 408 updates the measured values of the apparatus information contained in the electronic message outputted from the communication unit 406 among the apparatus information stored in the current information storage unit 402. For example, the electronic message reception unit 408 overwrites the measured values of the apparatus information contained in the electronic message on the measured values stored in the current information storage unit 402. Accordingly, the current information storage unit 402 stores the time when the electronic message has been transmitted, that is, the latest apparatus information of the substrate processing apparatus 10.

Furthermore, when the electronic message received from the communication unit 406 contains the event information, the electronic message reception unit 408 outputs the event information to the apparatus information registration unit 410.

The apparatus information registration unit 410 registers the apparatus information stored in the current information storage unit 402 according to the accumulation condition stored in the definition information storage unit 404 by referring to the definition information storage unit 404. Specifically, when the event information outputted from the electronic message reception unit 408 coincides with the event information stored as the accumulation condition in the definition information storage unit 404, the apparatus information registration unit 410 reads the apparatus information of the substrate processing apparatus 10, which is the transmission source of the event information, from the current information storage unit 402, and registers at least a part of the read apparatus information in the apparatus information DB 400 in correspondence to the time when the event has occurred. Herein, the apparatus information registration unit 410 reads only the defined apparatus information by referring to the definition information stored in the definition information storage unit 404, and processes the information into a predetermined data format, and registers the processed information. Accordingly, whenever the event as the accumulation condition occurs in the substrate processing apparatus 10, the apparatus information of the substrate processing apparatus 10 at the event occurrence time is accumulated in the apparatus information DB 400.

The terminal program 60 includes a user interface (UI) unit 600, an apparatus information acquisition unit 602, and a screen generation unit 604. The terminal program 60 is loaded into the memory 20 of the terminal device 6 and is executed on an OS (not shown) running on the control device 16.

In the terminal program 60, the UI unit 600 (display unit) receives information inputted through the display/input device 24 and outputs the received information to the apparatus information acquisition unit 602. For example, the UI unit 600 receives the name of the substrate processing apparatus 10, identification information such as identifier (ID), and time. Furthermore, the UI unit 600 displays a failure information screen (which will be described later) generated by the screen generation unit 604 on the display/input device 24.

The apparatus information acquisition unit 602 searches the apparatus information stored in the apparatus information DB 400, based upon the identification information and the time outputted from the UI unit 600, and acquires the apparatus information at the time with respect to the substrate processing apparatus 10 identified according to the identification information. The apparatus information acquisition unit 602 outputs the acquired apparatus information to the screen generation unit 604.

The screen generation unit 604 acquires the defined type of the apparatus information and the measured values of the apparatus information by referring to the definition information storage unit 404. The screen generation unit 604 generates a screen configuration of the failure information screen, based upon the type of the apparatus information. Furthermore, the screen generation unit 604 generates the failure information screen by mixing the apparatus information acquired by the apparatus information acquisition unit 602 in the screen configuration of the failure information screen. The screen generation unit 604 outputs the generated failure information screen to the UI unit 600. The failure information screen will be described later.

Figure 8A:
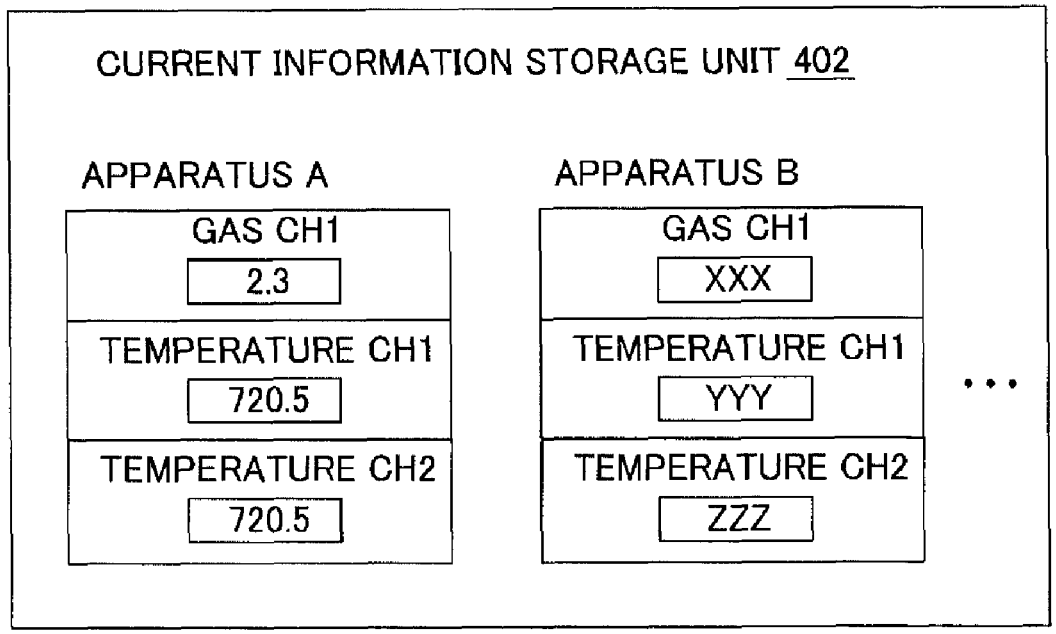
FIG. 8A and FIG. 8B schematically show the storage structures of a current information storage unit 402 and an apparatus information database (DB) 400 included in the group management program 40. Specifically.
Figure 8B:
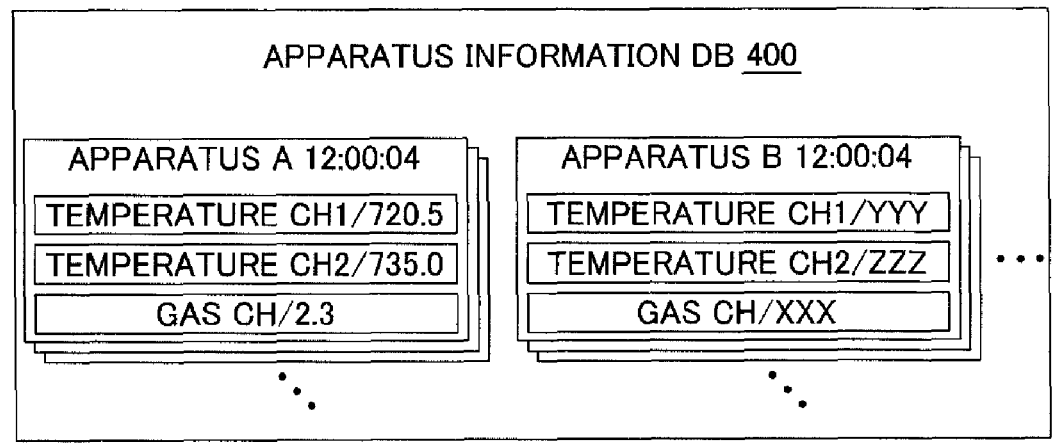

FIG. 8A and FIG. 8B schematically show the storage structures of the current information storage unit 402 and the apparatus information DB 400 included in the group management program 40. Specifically, FIG. 8A is an exemplary view of the current information storage unit 402, and FIG. 8B is an exemplary view of the apparatus information DB 400.

As exemplified in FIG. 8A, the current information storage unit 402 stores the apparatus information containing all types or the measured values of each substrate processing apparatus 10. The current information storage unit 402 stores the latest measured values of each apparatus information of each substrate processing apparatus 10. Therefore, the apparatus information stored in the current information storage unit 402 is updated only when the measured values are changed.

Although three types are exemplarily displayed in FIG. 8A and FIG. 8B, the number of the types is not limited to three.

As exemplified in FIG. 8B, the apparatus information DB 400 stores the apparatus information containing the types defined in the definition information storage unit 404 or their measured values in the respective substrate processing apparatuses 10. The apparatus information is accumulated whenever the accumulation condition defined in the definition information storage unit 404 is satisfied. The apparatus information at each time has a format in which a plurality of types and their measured values are configured into one data. For example, the type and its measured value are combined by the combination symbol such as "/", and the combined information is contained within one apparatus information.

Hereinafter, the operation of a substrate processing system 1 relevant to an embodiment of the present invention will be described in detail.

First, the substrate processing by the substrate processing apparatus 10 will be described.

As shown in FIG. 3 and FIG. 4, if the pod 110 is supplied to the load part 114, the pod carrying in/out opening 112 is opened by the front shutter 113, and the pod 110 on the load port 114 is carried from the pod carrying in/out opening 112 to the inside of the housing 111 by the pod carrying device 118.

The rotatable pod shelf 105 is automatically carried to the designated shelf plate 117 by the pod carrying device 118, and thus the carried-in pod 110 is delivered. Then, the pod 110 is temporarily deposited and then carried from the shelf plate 117 to the pod opener 121. Thereafter, the pod is temporarily deposited and then carried from the shelf plate 117 to the pod opener 121, and transferred to the placement table 122, or carried directly to the pod opener 121 and transferred to the placement table 122. At this point, the wafer carrying in/out opening 120 of the pod opener 121 is closed by the cap attaching/detaching mechanism 123, and the clean air 133 is circulated through the transfer chamber 124, and the transfer chamber 124 is filled with the clean air 133. For example, the transfer chamber 124 is filled with nitrogen gas as the clean air 133, and oxygen concentration is set to 20 ppm or less, which is much lower than oxygen concentration of the inside (ambient atmosphere) of the housing 111.

The end face of the opening side of the pod 110 placed on the placement table 122 is pressed against the margin of the opening of the wafer carrying in/out opening 120 in the front wall 119a of the sub housing 119 and, simultaneously, the cap is detached by the cap attaching/detaching mechanism 123 so that the wafer entrance/exit port is opened.

If the pod 110 is opened by the pod opener 121, the wafer 200 is picked up from the pod 110 through the wafer entrance/exit port by the tweezers 125c of the wafer transfer device 125a. Then, the wafer is aligned by the notch aligner 135, carried into the standby part 126 disposed in the rear of the transfer chamber 124, and then charged into the boat 217. The wafer transfer device 125a which has delivered the wafer 200 to the boat 217 returns to the pod 110 and charges the boat 217 with a next wafer 200.

While the wafer is being charged into the boat 217 by the wafer transfer mechanism 125 in the pod opener 121 of one end (upper or lower end), another pod 110 is carried and transferred from the rotatable pod shelf 105 by the pod carrying device 118 in the pod opener of the other end (lower or upper end) and the opening operation of the pod 110 is simultaneously performed by the pod opener 121.

If the boat 217 is charged with a predetermined number of wafers 200, the lower end of the process chamber 202 closed by the furnace port shutter 147 is opened by the furnace port shutter 147. Subsequently, as the seal cap 219 is moved upward by the boat elevator 115, the boat 217 holding the group of the wafers 200 is loaded into the process chamber 202.

After the loading, the wafers 200 are processed within the process chamber 202, based upon a predetermined recipe. After the wafer processing, the wafers 200 and the pod 110 are withdrawn to the outside of the housing 111 in the approximately opposite sequence, except the process of aligning the wafer in the notch aligner 135.

During the substrate processing, the substrate processing apparatus 10 transmits the electronic message containing the apparatus information of the substrate processing apparatus 10, such as temperature information, pressure information and gas information, to the group management server 4. Furthermore, the substrate processing apparatus 10 transmits the event information to the group management server 4 whenever the event occurs.

Next, explanation will be given on the operation of the group management server 4 relevant to the embodiment of the present invention.

Figure 9:
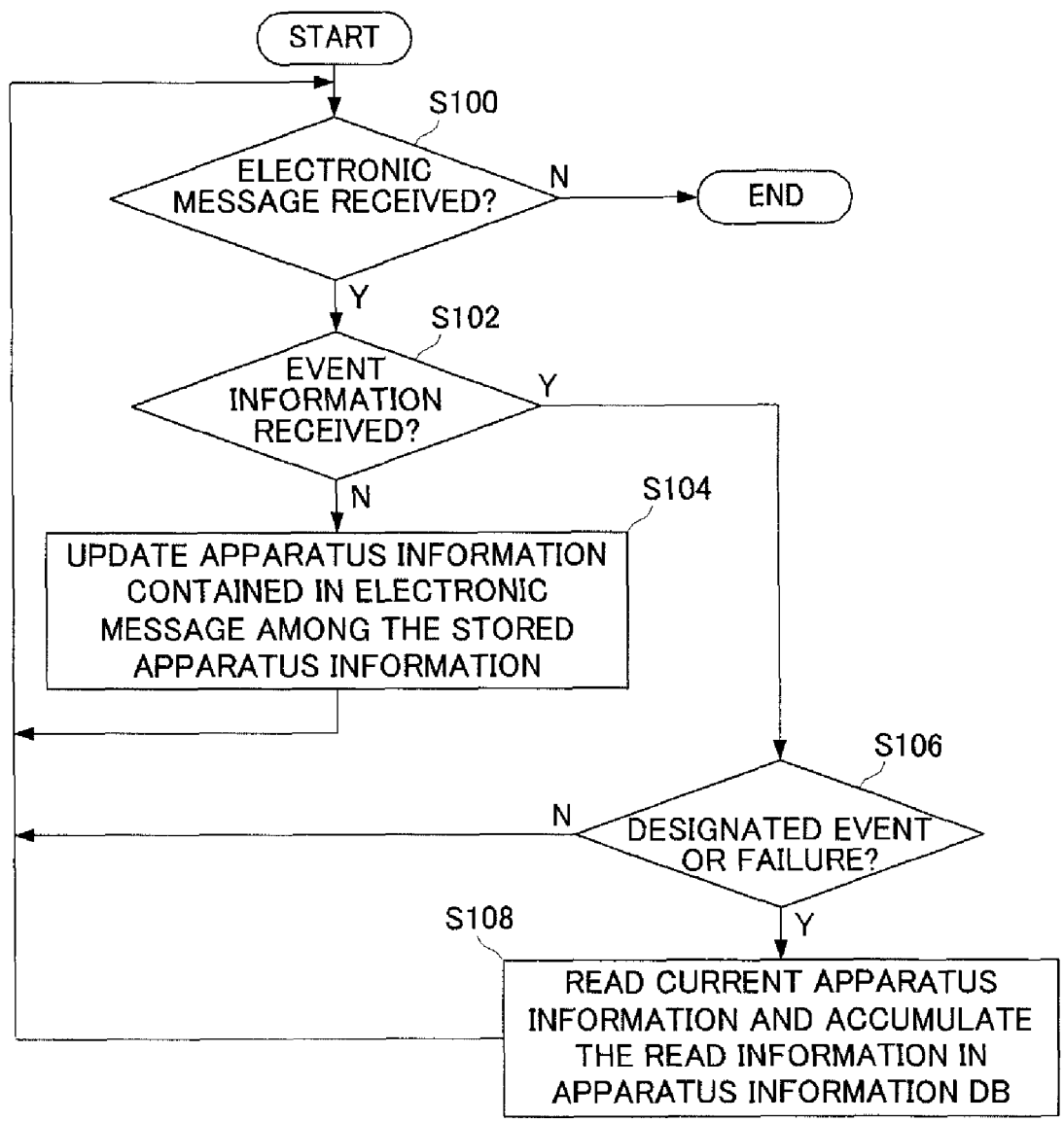
FIG. 9 is a flowchart illustrating the operation S10 of the group management server 4 relevant to the embodiment of the present invention.

FIG. 9 is a flowchart illustrating the operation S10 of the group management server 4 relevant to the embodiment of the present invention.

As shown in FIG. 9, the communication unit 406 of the group management server 4 (group management program 40) determines whether or not the electronic message is received from the substrate processing apparatus 10. If the electronic message is received (S100), the group management server 4 proceeds to the step 102 (S102); otherwise, the process is terminated.

In the step 102 (S102), the communication unit 406 outputs the electronic message to the electronic message reception unit 408, and the electronic message reception unit 408 determines whether or not the event information is contained in the outputted electronic message. If the event information is contained in the electronic message, the group management server 4 proceeds to the step 106 (S106); otherwise, the group management server 4 proceeds to the step 104 (S104).

In the step 104 (S104), the electronic message reception unit 408 updates the data of the apparatus information contained in the electronic message among the information stored in the current information storage unit 402. After the data updating, the group management server 4 returns to the step 100 (S100).

In the step 106 (S106), the electronic message reception unit 408 outputs the event information contained in the electronic message to the apparatus information registration unit 410, and the apparatus information registration unit 410 determines whether or not the event information is designated as the accumulation condition. If the event information is designated as the accumulation condition, the group management server 4 proceeds to the step 108 (S108); otherwise, the group management server 4 returns to the step 100 (S100).

In the step 108 (S108), the apparatus information registration unit 410 reads the apparatus information of the substrate processing apparatus 10 of the event information transmission source as the apparatus information stored in the current information storage unit 402, and accumulates the read information in the apparatus information DB 400 by relating the apparatus information to the event occurrence time. After the accumulation, the group management server 4 returns to the step 100 (S100).

As described above, in the group management server 4, the latest information among the apparatus information from the substrate processing apparatus 10 is stored in the current information storage unit 402, and only the event information defined in the definition information of the definition information storage unit 404 among the information stored in the current information storage unit 402 is accumulated in the apparatus information DB 400, but the operation of the group management server 4 is not limited thereto.

For example, in the group management server 4, only the apparatus information defined in the definition information among the apparatus information of the substrate processing apparatus 10 is stored in the current information storage unit 402 by previously referring to the definition information of the definition information storage unit 404. Among the information stored in the current information storage unit 402, only the event information defined in the definition information of the definition information storage unit 404 may be accumulated in the apparatus information DB 400.

Next, explanation will be given on the reading of the information about the substrate processing apparatus 10 by using the terminal device 6.

FIG. 10A and FIG. 10B are exemplary views of the failure information screen displayed on the terminal device 6.

FIG. 10A shows the case where the type designated as the definition information in the definition information storage unit 404 coincides with the apparatus information type of the desired time stored in the apparatus information DB 400. As exemplified in FIG. 10A, the failure information screen contains the contents of failure and the apparatus information in the occurrence of failure, and the apparatus information contains the types defined in the definition information storage unit 404 and the measured values in the occurrence of failure. Herein, the measured values corresponding to all defined types are displayed.

The definition information stored in the definition information storage unit 404 may be changed. Therefore, if the definition information is changed, the type designated in the definition information may not coincide with the type of the apparatus information at the desired time.

FIG. 10B shows the case where the type designated as the definition information in the definition information storage unit 404 does not coincide with the apparatus information type of the desired time stored in the apparatus information DB 400. As exemplified in FIG. 10B, in the case where the type "pressure" is defined in the definition information of the search time point, while the type "pressure" is not defined in the definition information of the desired time point, the measured value of the type "pressure" at that time is not accumulated in the apparatus information DB 400. In this case, the type "pressure" field of the failure information screen is not filled with the measured value, but remains blank.

As mentioned above, when the definition information is changed, the terminal device 6 can display the accumulated type information among the apparatus information of the substrate processing apparatus 10. The measured values about the types which are accumulated in the apparatus information DB 400 but not defined in the definition information on the search time are acquired from the group management server 4 by the terminal device 6, but are not displayed on the failure information screen.

As described above, the substrate processing system 1 relevant to the present invention includes the group management server 4 and the terminal device 6. The group management server 4 retains the latest apparatus information of the substrate processing apparatus 10, based upon the electronic message transmitted from the substrate processing apparatus 10, and accumulates the types designated among the apparatus information and their measured values in the apparatus information DB 400 at the timing when the event occurs in the substrate processing apparatus 10. The terminal device 6 searches the apparatus information stored in the apparatus information DB 400 of the group management server 4. Therefore, since the apparatus information at each timing contains the measured values of the defined types, the terminal device 6 can search the apparatus information, based upon the time information. Thus, upon the search, there is no need to compensate the measured values of the types by going back to the past. Therefore, since the search time is reduced, the efficiency of operations such as data analysis can be improved.

Next, explanation will be given on the exemplary modified storage structure of the current information storage unit 402 and the item information DB 412 in the group management program 40. The item information contains the apparatus information and the event information.

Figure 11A:
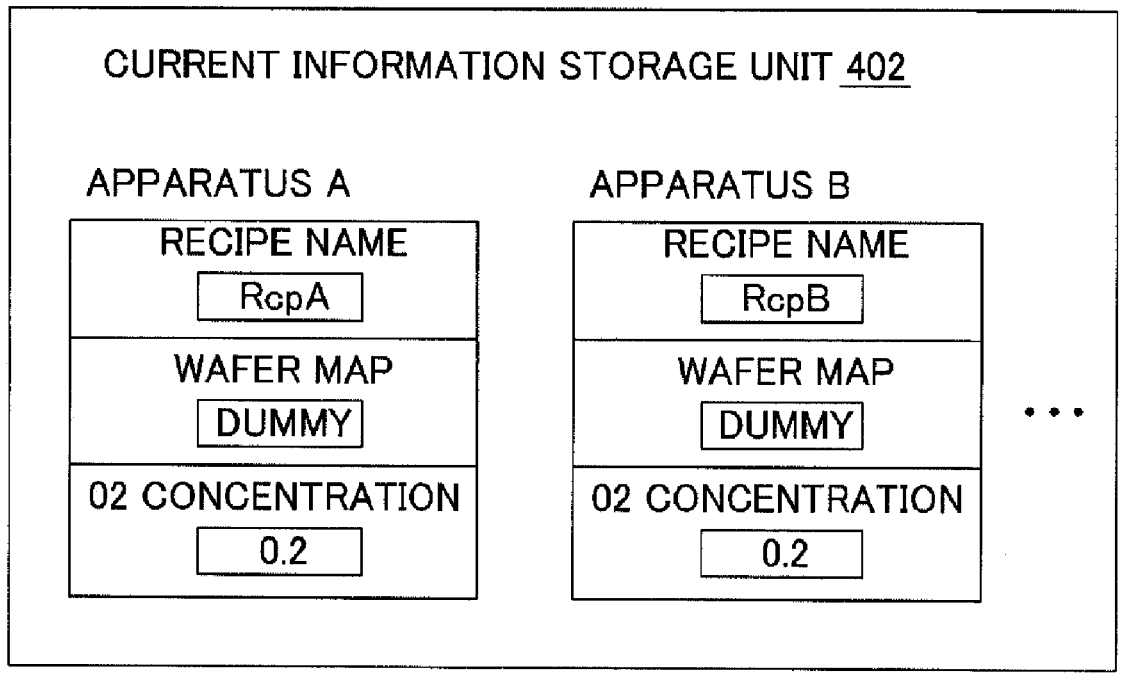
FIG. 11A and FIG. 11B illustrate the exemplary modified storage structure of a current information storage unit 402 and an item information DB 412 in the group management program 40. Specifically, FIG. 11A exemplarily shows the current information storage unit 402, and FIG. 11B exemplarily shows the item information DB 412.
Figure 11B:
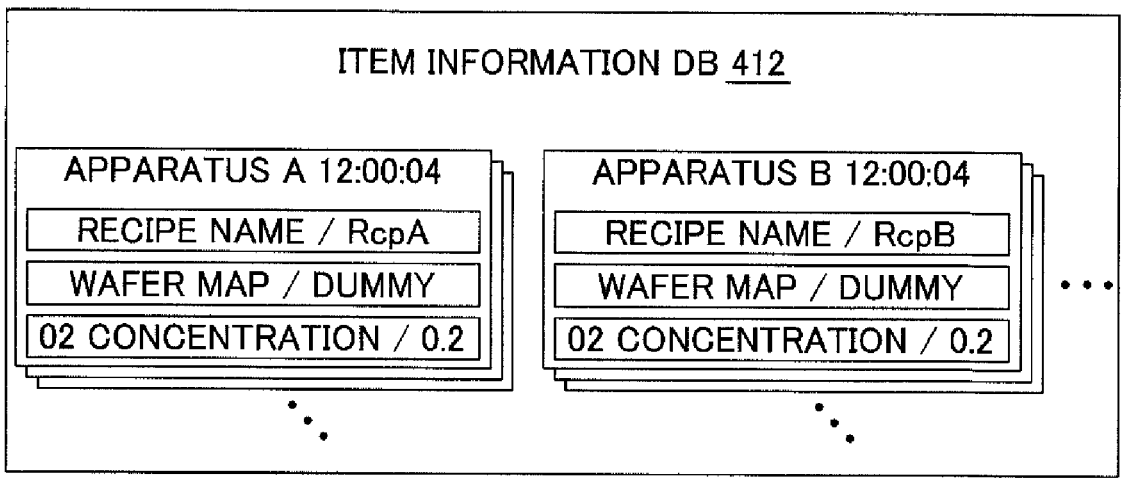

FIG. 11A and FIG. 11B illustrate the exemplary modified storage structure of the current information storage unit 402 and the item information DB 412 in the group management program 40. Specifically, FIG. 11A exemplarily shows the current information storage unit 402, and FIG. 11B exemplarily shows the item information DB 412.

As exemplified in FIG. 11B, the item information may contain information about process recipe (for example, name of the process recipe), wafer map, and $O_2$ concentration. That is, the item information may contain the process information of each substrate processing apparatus 10. For example, if there are changes in the name of the process recipe, the wafer map and the $O_2$ concentration when the boat 217 starts to move upward and finishes moving upward, the user can confirm the difference by using the terminal device 6 to acquire the information about the time before and after the boat 217 moves upward. The wafer map or $O_2$ concentration is merely exemplary, and other types may be stored.

Next, in order to monitor the substrate processing apparatus more thoroughly and also further improve the response of the monitoring, the transmission period of the apparatus information tends to be shortened (the frequency of the transmission tends to be increased). In order to achieve this object, the following improvement was made.

In a substrate processing system with one or more substrate processing apparatuses and a group management server collecting apparatus information from the substrate processing apparatuses, the group management server includes: a communication unit receiving the apparatus information; an electronic message analysis unit receiving the apparatus information from the communication unit to read time information attached to the apparatus information; a temporary storage unit temporarily accumulating the apparatus information received from the electronic message analysis unit and creating pack information; and a storage unit receiving the apparatus information, to which the pack information is attached, from the electronic message analysis unit. If the read time is earlier than a writing timing which is repeated at a predetermined period, the electronic message analysis unit transmits the apparatus information to the temporary storage unit and adds the apparatus information to the pack information, and, if the read time is later than the writing timing, the electronic message analysis unit reads the pack information from the temporary storage unit, attaches the pack information to the apparatus information, and transmits the apparatus information, to which the pack information is attached, to the storage unit.

In accordance with the substrate processing system of the present invention, even though the transmission interval of the apparatus information from the substrate processing apparatus to the group management server is shortened, the load of the group management server can be reduced by decreasing the frequency of writing to the DB in the group management server.

At the inside of the substrate processing apparatus 100, there exist a plurality of parts which generate information indicating a variety of states of the substrate processing apparatus, such as temperature, gas flow rate, pressure and the like (hereinafter, referred to as apparatus information), (for example, as described with reference to FIG. 21, a temperature sensor 263, an MFC 241, and a pressure sensor 245, hereinafter, referred as information generation parts). As described with reference to FIG. 21, a controller 240 for the substrate processing apparatus is configured to create an electronic message (also called a monitor electronic message) containing apparatus information generated in the respective information generation parts. Furthermore, the apparatus information within the electronic message additionally contains information about generation time of the apparatus information (for example, information which specifies information generation time). The controller 240 for the substrate processing apparatus is configured to transmit the created electronic message to a group management server 500 which will be described later. The electronic message may be transmitted periodically at predetermined intervals (for example, intervals of 0.1 second), or may be transmitted whenever the apparatus information is generated, or may be transmitted in a manner of those combination.

(Structure of Process Furnace)

The structure of the process furnace 202 in accordance with an embodiment will be described below with reference to FIG. 21. FIG. 21 is a vertical cross-sectional view of the process furnace 202 of the substrate processing apparatus in accordance with an embodiment of the present invention.

Figure 21:
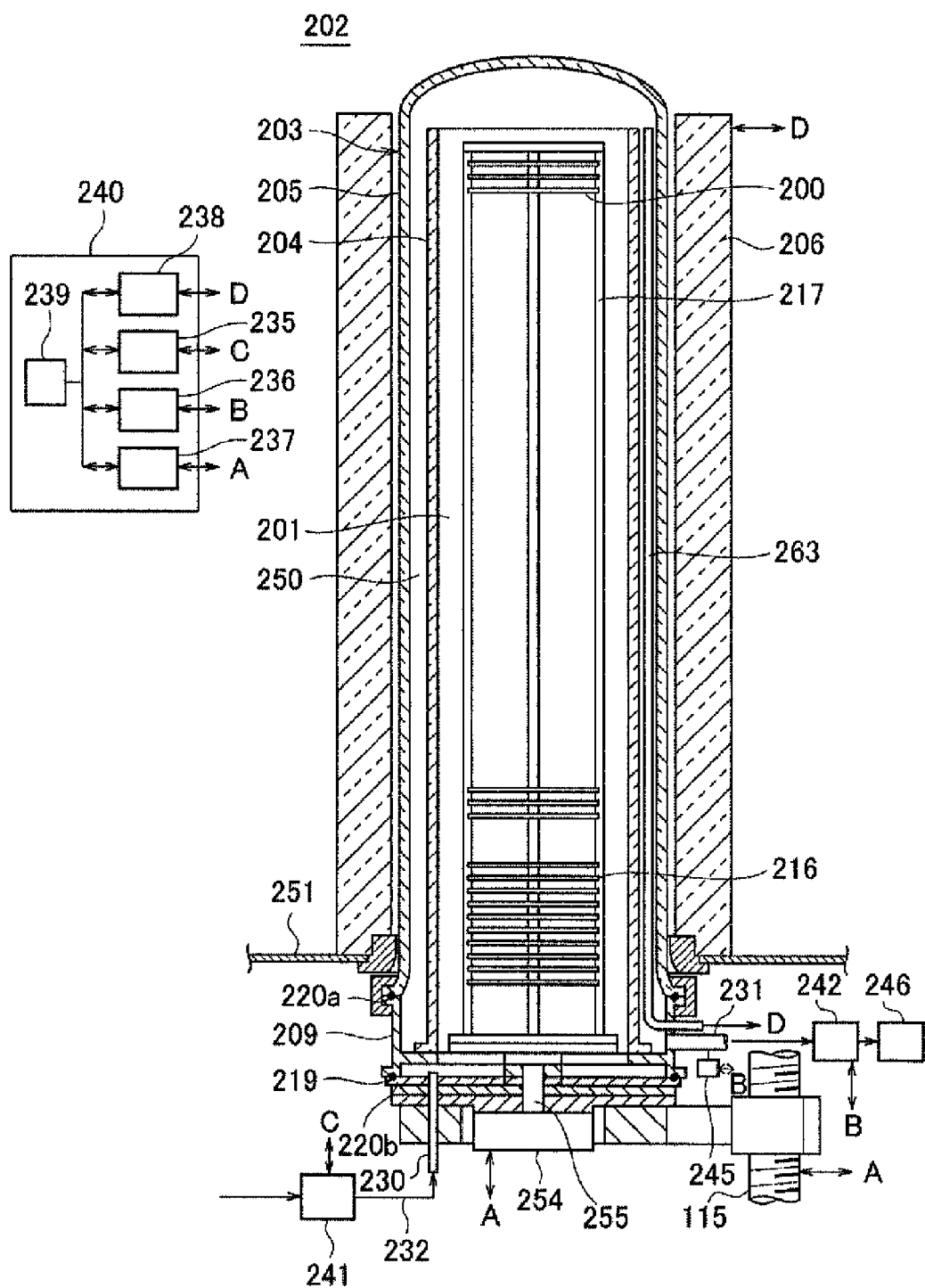
FIG. 21 is a vertical cross-sectional view of the process furnace of the substrate processing apparatus in accordance with an embodiment of the present invention.

As shown in FIG. 21, the process furnace 202 includes a process tube 203 as a reaction tube. The process tube 203 includes an inner tube 204 as an inner reaction tube, and an outer tube 205 as an outer reaction tube which is installed outside the inner tube 204. The inner tube 204 is made of a heat-resistant material such as quartz ($SiO_2$) or silicon carbide (SiC), and is formed in a cylindrical shape with upper and lower parts opened. At the inside of the cylindrical hollow part of the inner tube 204, a process chamber 201 is formed which processes a wafer 200 as a substrate. The inside of the process chamber 201 is configured to accommodate a boat 217 which will be described later. The outer tube 205 is installed concentrically with the inner tube 204. The inner diameter of the outer tube 205 is greater than the outer diameter of the inner tube 204, and the outer tube 205 is formed in a cylindrical shape with an upper part closed and a lower part opened. The outer tube 205 is made of a heat-resistant material such as quartz or silicon carbide.

At the outside of the process tube 203, a heater 206 as a heating mechanism is installed so that it surrounds the side-wall surface of the process tube 203. The heater 206 is formed in a cylindrical shape and is supported by a heater base 251 as a holding plate, so that the heater 206 is installed vertically.

At the lower part of the outer tube 205, a manifold 209 is installed concentrically with the outer tube 205. The manifold 209 is made of a material such as stainless steel and is formed in a cylindrical shape with upper and lower parts opened. The manifold 209 is coupled to the lower end of the inner tube 204 and the lower end of the outer tube 205 and is installed to support them. In addition, an O-ring 220*a* as a seal member is installed between the manifold 209 and the outer tube 205. The manifold 209 is supported on the heater base 251, so that the process tube 203 is installed vertically. A reaction vessel is configured by the process tube 203 and the manifold 209.

A seal cap 219, which will be described later, nozzles 230 as a gas introduction part is connected to communicate with the inside of the process chamber 201. A gas supply pipe 232 is connected to the nozzles 230. At the upstream part of the gas supply pipe 232 (opposite side to the connection part between the gas supply pipe 232 and the nozzles 230), a process gas supply source (not shown) or an inert gas supply source is connected through an MFC (mass flow controller) 241 as a gas flow rate controller. A gas flow rate control unit 235 is electrically connected to the MFC 241. The gas flow rate control unit 235 is configured to control the MFC 241 so that gas is supplied into the process chamber 201 at a desired flow rate at a desired timing.

At the manifold 209, an exhaust pipe 231 exhausting inside atmosphere of the process chamber 201 is installed. The exhaust pipe 231 is installed at the lower part of a cylindrical shape 250 formed by the gap between the inner tube 204 and the outer tube 205, and communicates with the cylindrical space 250. At the downstream part of the exhaust pipe 231 (opposite side to the connection part between the exhaust pipe 231 and the manifold 209), a pressure sensor 245 as a pressure detector, a pressure control device 242 configured by an Auto Pressure Controller (APC), and a vacuum exhaust device 246 such as a vacuum pump are connected sequentially from the upstream part. A pressure control unit 236 is electrically connected to the pressure control device 242 and the pressure sensor 245. The pressure control unit 236 is configured to control the pressure control device 242 to make the pressure inside the process chamber 201 to a desired level at a desired timing, based upon the pressure value detected by the pressure sensor 245.

At the lower part of the manifold 209, the seal cap 219 is installed as a furnace throat lid which can air-tightly close the lower opening of the manifold 209. The seal cap 219 is configured to contact the lower end of the manifold 209 from a vertically lower side. The seal cap 219 is made of a metal such as stainless steal and is formed in a disk shape. On the seal cap 219, an O-ring 220*b* as a seal member is installed to contact the lower end of the manifold 209. At the opposite side to the process chamber 201 in the vicinity of the center part of the seal cap 219, a rotating mechanism 254 for rotating a boat 217 is installed. A rotation shaft 255 of the rotating mechanism 254 passes through the seal cap 219 and supports the boat 217 upward. The rotating mechanism 254 is configured to rotate the boat 217 so that a wafer 200 is rotated. The seal cap 219 is configured so that it is moved in a vertical direction by a boat elevator 115 as an elevating mechanism installed vertically at the outside of the process tube 203. By moving the seal cap 219 upward or downward, the boat 217 can be loaded into or unloaded from the process chamber 201. A driving control unit 237 is electrically connected to the rotating mechanism 254 and the boat elevator 115. The driving control unit 237 is configured to control the rotating mechanism 254 and the boat elevator 115 to perform desired operations at desired timing.

As mentioned above, the boat 217 as a substrate holder is configured to hold a plurality of wafers 200 at a horizontal position, with their centers aligned, in multiple stages. The boat 217 is made of a heat-resistant material such as quartz or silicon carbide. At the lower part of the boat 217, a plurality of heat insulation plates 216 as disk-shaped insulation members made of a heat-resistant material such as quartz or silicon carbide are arranged at a horizontal position in multiple stages, and are configured to make it difficult to transfer heat from the heater 206 to the manifold 209.

At the inside of the process tube 203, a temperature sensor 263 as a temperature detector is installed. A temperature control unit 238 is electrically connected to the heater 206 and the temperature sensor 263. The temperature control unit 238 is configured to control an electrified state of the heater 206, based upon temperature information detected by the temperature sensor 263, in order that temperature inside the process chamber 201 is made to have a desired temperature distribution at a desired timing.

The gas flow rate control unit 235, the pressure control unit 236, the driving control unit 237, and the temperature control unit 238 are electrically connected to a main control unit 239 which controls an overall operation of the substrate processing apparatus (hereinafter, the gas flow rate control unit 235, the pressure control unit 236, the driving control unit 237, and the temperature control unit 238 will be referred to as an I/O control unit). The gas flow rate control unit 235, the pressure control unit 236, the driving control unit 237, the temperature control unit 238, and the main control unit 239 are configured as the controller 240 for the substrate processing apparatus.

(Operation of Process Furnace)

Next, explanation will be given on a method for forming a thin film on a wafer 200 through a CVD process by using the process chamber 202 having the above-mentioned structure, as one of semiconductor device manufacturing processes, with reference to FIG. 21. Furthermore, in the following explanation, operations of the respective components constituting the substrate processing apparatus are controlled by the controller 240.

If a plurality of wafers 200 are charged into the boat 217 (wafer charge), as shown in FIG. 21, the boat 217 holding the plurality of wafers 200 is moved upward by the boat elevator 115 and is loaded into the process chamber 201 (boat loading). In such a state, the seal cap 219 seals the lower end of the manifold 209 through the O-ring 220*b*.

The inside of the process chamber 201 is vacuum-exhausted to a desired pressure (vacuum degree) by the vacuum exhaust device 246. In this case, the valve opening degree of the pressure control device 242 is feedback controlled, based upon the input value measured by the pressure sensor 245. Furthermore, the inside of the process chamber 201 is heated to a desired temperature by the heater 206. In this case, the electrified amount of the heater 206 is feedback controlled, based upon the temperature value detected by the temperature sensor 263. Then, the boat 217 and the wafers 200 are rotated by the rotating mechanism 254.

Thereafter, gas which is supplied from the process gas supply source and whose flow rate is adjusted to a desired level by the MFC 241 flows through the inside of the gas supply pipe 232 and then is introduced into the process chamber 201 through the nozzles 230. The introduced gas rises up within the process chamber 201, flows from the upper opening of the inner tube 204 to the cylindrical space 250, and then is exhausted through the exhaust pipe 231. The gas is brought into contact with the surface of the wafer 200 when passing through the inside of the process chamber 201 and, at this time, a thin film is deposited on the surface of the wafer 200 by a thermal CVD reaction.

When a prescribed time passes by, inert gas is supplied from the inert gas supply source, the inside of the process chamber 201 is substituted with the inert gas, and simultaneously, the pressure inside the process chamber 201 is recovered to a normal pressure.

Then, the seal cap 219 is moved downward by the boat elevator 115 so that the lower end of the manifold 209 is opened, and simultaneously, the boat 217 holding the processed wafers 200 is unloaded from the lower end of the manifold 209 to the outside of the process tube 203 (boat unloading). Thereafter, the processed wafers 200 are discharged from the boat 217 and stored in the pod 110 (wafer discharge).

Figure 12:
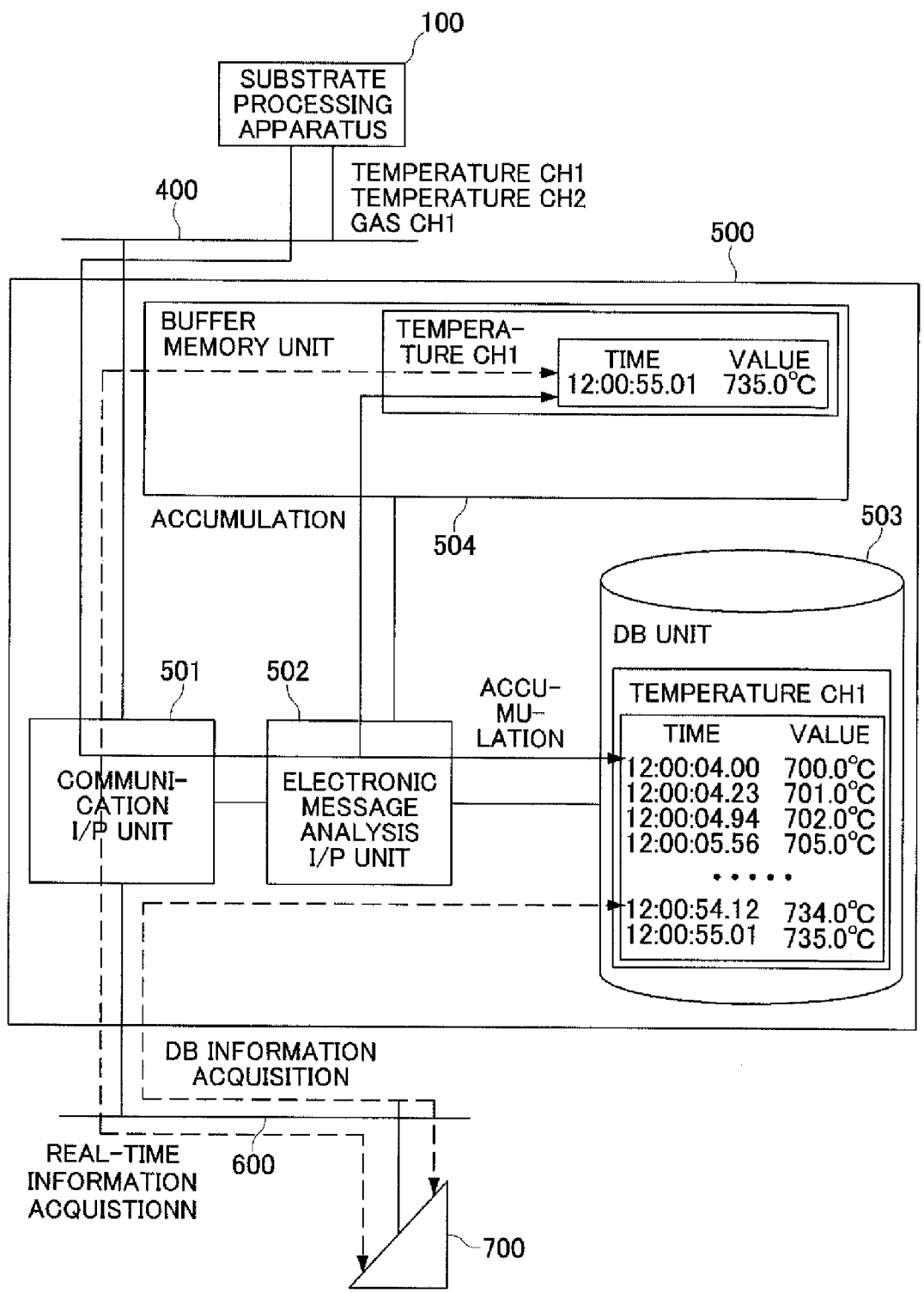
FIG. 12 is a block diagram of a group management server in accordance with an embodiment of the present invention.

Next, the structure of the group management server 500 in accordance with an embodiment will be described with reference to FIG. 12. FIG. 12 is a block diagram of the group management server 50 in accordance with an embodiment of the present invention.

The group management server 500 in accordance with the embodiment is configured by a computer including a central processing unit (CPU), a memory, a storage device such as an HDD, and a communication port. A group management program is stored in the storage device. The group management program is read from the storage device to the memory and is executed by the CPU. The group management server 500 includes a communication I/F (interface) unit 501 as a communication unit, an electronic message analysis unit 502, a buffer memory unit 504 as a temporary storage unit, and a DB (database) unit 503 as a storage unit, which will be described later.

(Communication I/F Unit)

As mentioned above, the group management server 500 is configured so that the electronic message containing apparatus information indicating various states of the substrate processing apparatus (also called a monitor electronic message) is transmitted from the substrate processing apparatus 100 through a network 400. The apparatus information within the electronic message additionally contains information about generation time of the apparatus information (for example, information which specifies information generation time). The electronic message is transmitted periodically at predetermined intervals (for example, intervals of 0.1 second), or is transmitted whenever the apparatus information is generated, or is transmitted in a manner of those combination. The communication I/F unit 501 is configured to receive the electronic message from the substrate processing apparatus 100 through the network 400 and transmit the received electronic message to the electronic message analysis unit 502.

In addition, as mentioned above, the group management server 500 is configured so that a reading request message for the apparatus information is transmitted from a manipulation terminal 700 through the network 600. The reading request message contains index information that specifies the apparatus information to be read. The reading request message is configured so that it is transmitted periodically at predetermined intervals (for example, intervals of 1 second), or is transmitted at every time in response to the operator's manipulation, or is transmitted in a manner of those combination. The communication I/F unit 501 is configured to receive the reading request message from the manipulation terminal 700 through the network 400 and transmit the received reading request message to the electronic message analysis unit 502. Furthermore, the communication I/F unit 501 is configured to receive a reading response message from the electronic message analysis unit 502 and transmit the received reading response message to the manipulation terminal 700.

(Electronic Message Analysis Unit)

The electronic message analysis unit 502 is configured to receive the electronic message from the communication I/F unit 501 and read the apparatus information and the time information attached to the apparatus information from the electronic message. The electronic message analysis unit 502 is configured to compare the time specified by the time information with the writing timing that is repeated at a predetermined period. Herein, the writing timing refers to a timing of transmitting pack information or the like, which is temporarily accumulated in the buffer memory unit 504, to the DB unit 503 (the pack information is stored as DB). Preferably, the transmission period of the electronic message transmitted from the substrate processing message 100 is shorter than the repetition period of the writing timing. Moreover, the repetition period of the writing timing can be set arbitrarily.

Furthermore, if the time read from the electronic message (time specified by the time information added to the apparatus information) is earlier than the writing timing which is repeated at a predetermined period, the electronic message analysis unit 502 transmits the apparatus information read from the electronic message to the buffer memory unit 504, and creates the pack information, which will be described later, (to create new pack information or add the apparatus information to the existing pack information).

Moreover, if the time read from the electronic message (time specified by the time information added to the apparatus information) is later than the writing timing which is repeated at a predetermined period, the electronic message analysis unit 502 reads the pack information from the buffer memory unit 504, attaches the read pack information to the apparatus information, and transmits the apparatus information, to which the pack information is attached, to the DB unit 503.

In addition, the electronic message analysis unit 502 is configured to receive the reading request message from the communication I/F unit 501, read the index information, which specifies the apparatus information to be read, from the reading request message, and transmit the index information to the DB unit 503 or the buffer memory unit 504.

Furthermore, the electronic message analysis unit 502 is configured to receive the apparatus information, the time information attached to the apparatus information, and the pack information attached to the apparatus information, from the DB unit 503 or the buffer memory unit 504, create the reading response message containing them, and transmit the reading response message to the communication I/F unit 501.

(Buffer Memory Unit)

The buffer memory unit 504 as a temporary storage unit is configured to receive the apparatus information and the time information attached to the apparatus information from the electronic message analysis unit 502, temporarily accumulate them, and create the pack information. Specifically, the buffer memory unit 504 is configured to retain the latest apparatus information and the time information of the apparatus information, which are received from the electronic message analysis unit 502, as current values (latest values), and simultaneously, create new pack information, based upon the apparatus information and the time information of the apparatus information, which was received prior to the above apparatus information. Alternatively, the buffer memory unit 504 is configured to attach the apparatus information to the existing pack information.

Figure 15A:
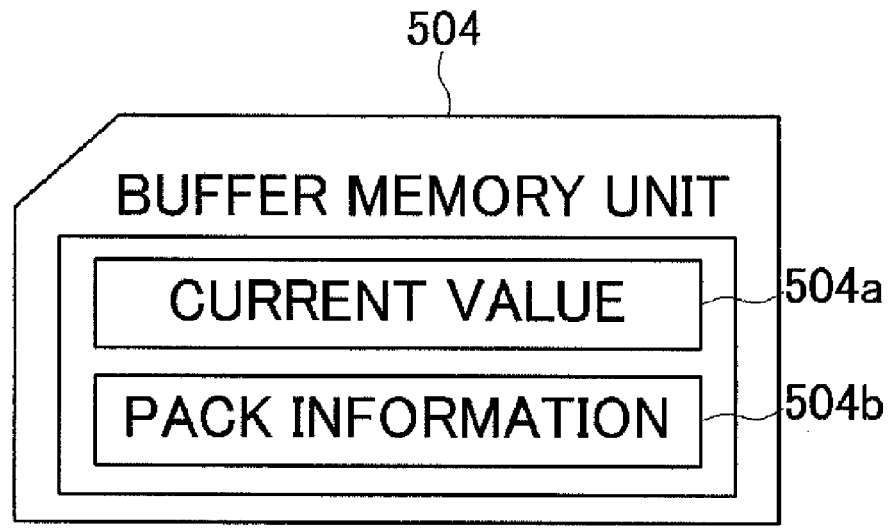
FIG. 15A illustrates an exemplary internal memory configuration of the buffer memory unit in accordance with an embodiment.

FIG. 15A illustrates an exemplary internal memory configuration of the buffer memory unit 504 in accordance with this embodiment. As shown in FIG. 15A, at the inside of the buffer memory unit 504, a first area 504a storing the current values (latest apparatus information and time information of the latest apparatus information) received from the electronic message analysis unit 502, and a second area 504b storing the created pack information are installed.

Figure 14:
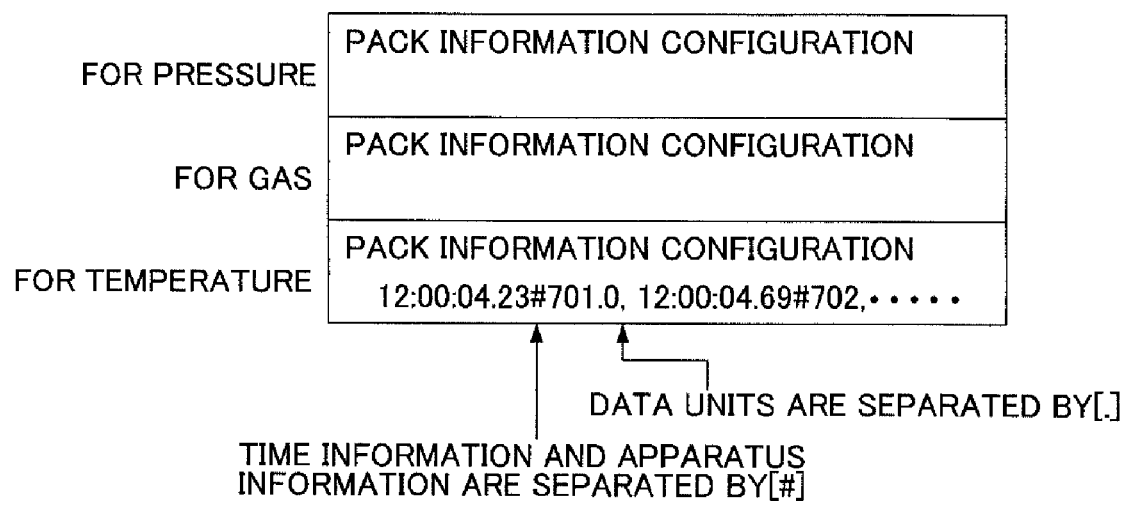
FIG. 14 illustrates an exemplary data configuration of the pack information in accordance with an embodiment of the present invention.

FIG. 14 illustrates an exemplary data configuration of the pack information in accordance with this embodiment. The pack information is created according to kinds of the apparatus information (for example, pressure, gas flow rate, temperature, or the like). Each of the pack information includes one or more data units where "time information of the apparatus information" and the "apparatus information" are connected by a predetermined separating character (in this embodiment, '#'). The data units are temporally arranged so that new data unit is positioned behind in the generation time. The adjacent data units are connected by a separating character (in this embodiment, ".") different from the above-mentioned separating character. In the example of FIG. 14, the pack information includes a data unit where the generation time "12:00:04.23" and the apparatus information "701.0" are connected by a separating character "#", and a data unit where the generation time "12:00:04.69" and the apparatus information "702.0" are connected by a separating character "#", and those data units are temporally connected by a separating character ",".

(DB Unit)

As mentioned above, if the read time is later than the writing timing, the electronic message analysis unit 502 reads the pack information from the buffer memory unit 504, attaches the pack information to the apparatus information, and transmits the apparatus information, to which the pack information is attached, to the DB unit 503. The DB unit 503 as the storage unit is configured to receive the apparatus information, to which the pack information is attached, from the electronic message analysis unit 502, and store it so that it can be accessed by the manipulation terminal 700.

Figure 15B:
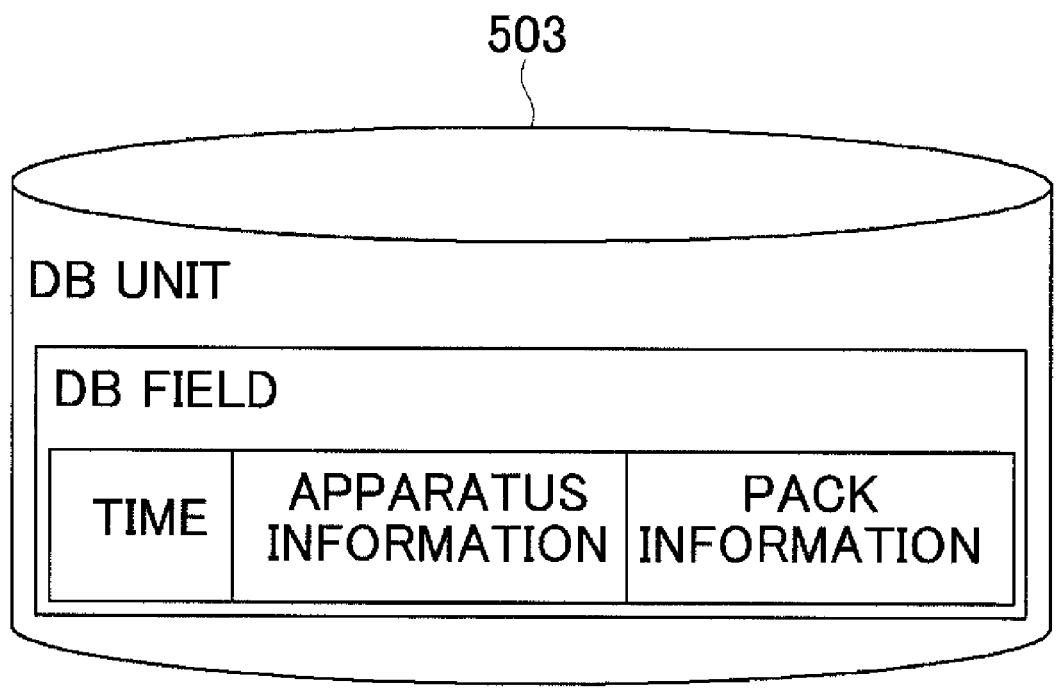
FIG. 15B illustrates an exemplary internal configuration of the DB field of the DB unit in accordance with an embodiment of the present invention.

FIG. 15B illustrates an exemplary internal configuration of the DB field of the DB unit 503. The apparatus information, the time information of the apparatus information, and the pack information attached to the apparatus information are stored in a correlated state by the above-mentioned index information.

In addition, as mentioned above, the electronic message analysis unit 502 is configured to receive the reading request message from the communication I/F unit 501, extract the above-mentioned index information from the reading request message, and transmit the extracted index information to the DB unit 503. If receiving the index information from the electronic message analysis unit 502, the DB unit 503 reads the apparatus information, the time information of the apparatus information, and the pack information attached to the apparatus information, which are correlated by the index information, and transmits the read information to the electronic message analysis unit 502.

(Operation of Group Management Server)

Next, the operation of the group management server 500 in accordance with this embodiment will be described with reference to the drawings.

(Upon Reception of Electronic Message)

Figure 19:
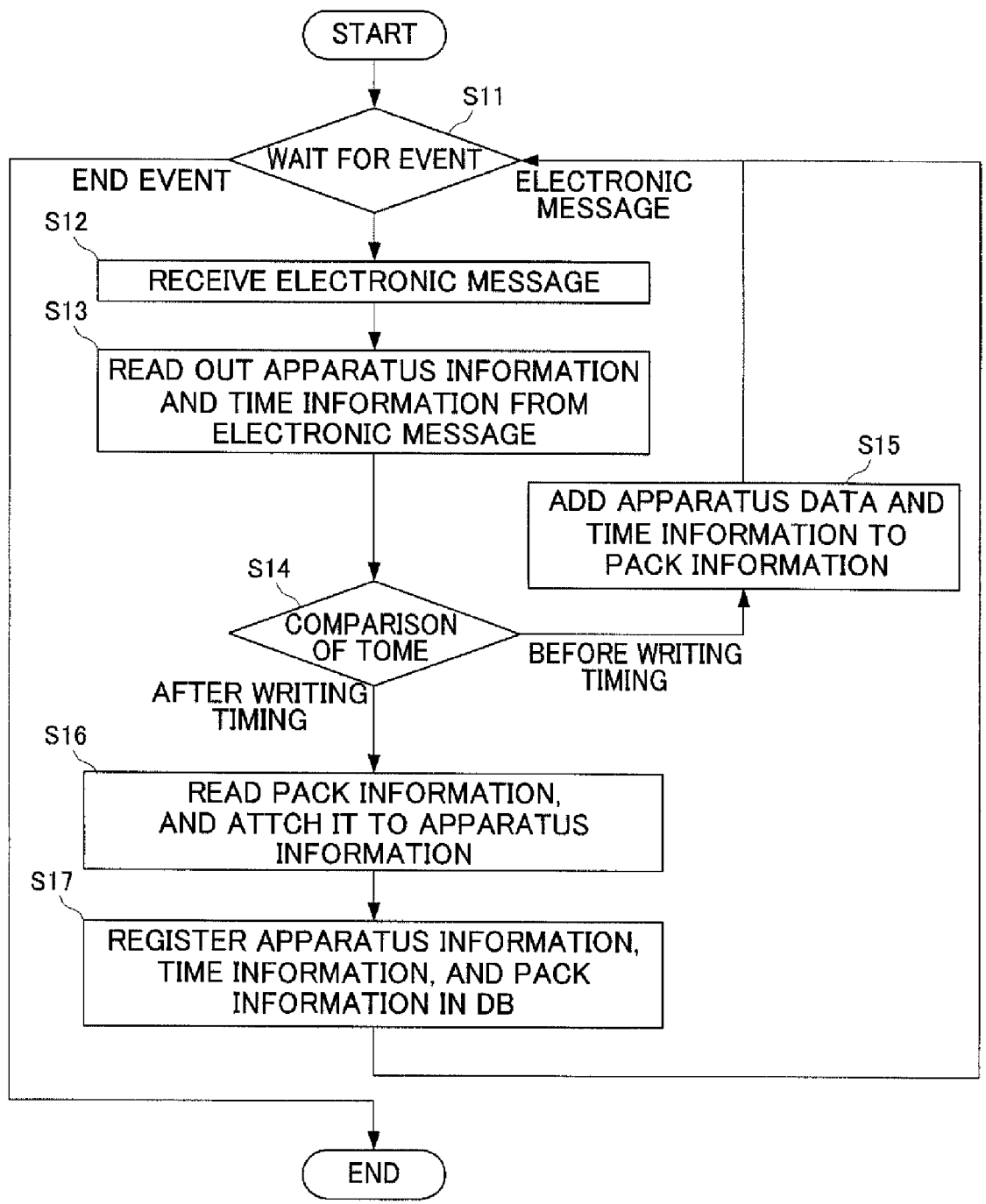
FIG. 19 is a flowchart illustrating the operation of the group management server when the electronic message is transmitted from the substrate processing apparatus, in accordance with an embodiment of the present invention.

First, the operation of the group management server 500 when the electronic message is transmitted from the substrate processing apparatus 100) will be briefly described with reference to FIG. 19. FIG. 19 is a flowchart illustrating the operation of the group management server in accordance with this embodiment when the electronic message is transmitted from the substrate processing apparatus.

As shown in FIG. 19, after the group management program runs, the group management server 500 waits for the event until a predetermined end event such as termination manipulation occurs (S11). If the electronic message is transmitted from the substrate processing apparatus 100, the communication I/F unit 501 receives the electronic message from the substrate processing apparatus 100 through the network 400, and transmits the received electronic message to the electronic message analysis unit 502 (S12).

The electronic message analysis unit 502 receives the electronic message from the communication I/F unit 501, and reads the apparatus information and the time information added to the apparatus information from the electronic message (S13). Then, the electronic message analysis unit 502 compares the time specified by the time information with the writing timing repeated at a predetermined period (S14).

If the time specified by the time information is earlier than the writing timing repeated at the predetermined period, the electronic message analysis unit 502 transmits the apparatus information to the buffer memory unit 504. The buffer memory unit 504 receives the apparatus information and the time information added to the apparatus information, temporarily stores them, and creates the above-mentioned pack information (S15). Thereafter, the group management server 500 returns to the state (S11) of waiting for the above-mentioned event.

Meanwhile, if the time specified by the time information is later than the writing timing repeated at the predetermined period, the electronic message analysis unit 502 reads the pack information from the buffer memory unit 504, attaches it to the apparatus information, and transmits the apparatus information, to which the pack information is attached, to the DB unit 508 (S16). The DB unit 503 receives the apparatus information, to which the pack information is attached, from the electronic message analysis unit 502, and stores the received apparatus information so that it can be accessed by the manipulation terminal 700 (S17). After that, the group management server 500 returns to the state (S11) of waiting for the above-mentioned event.

Next, the above-mentioned exemplary operation will be described in more detail with reference to FIG. 13 and FIG. 16A to FIG. 16D.

Figure 13:
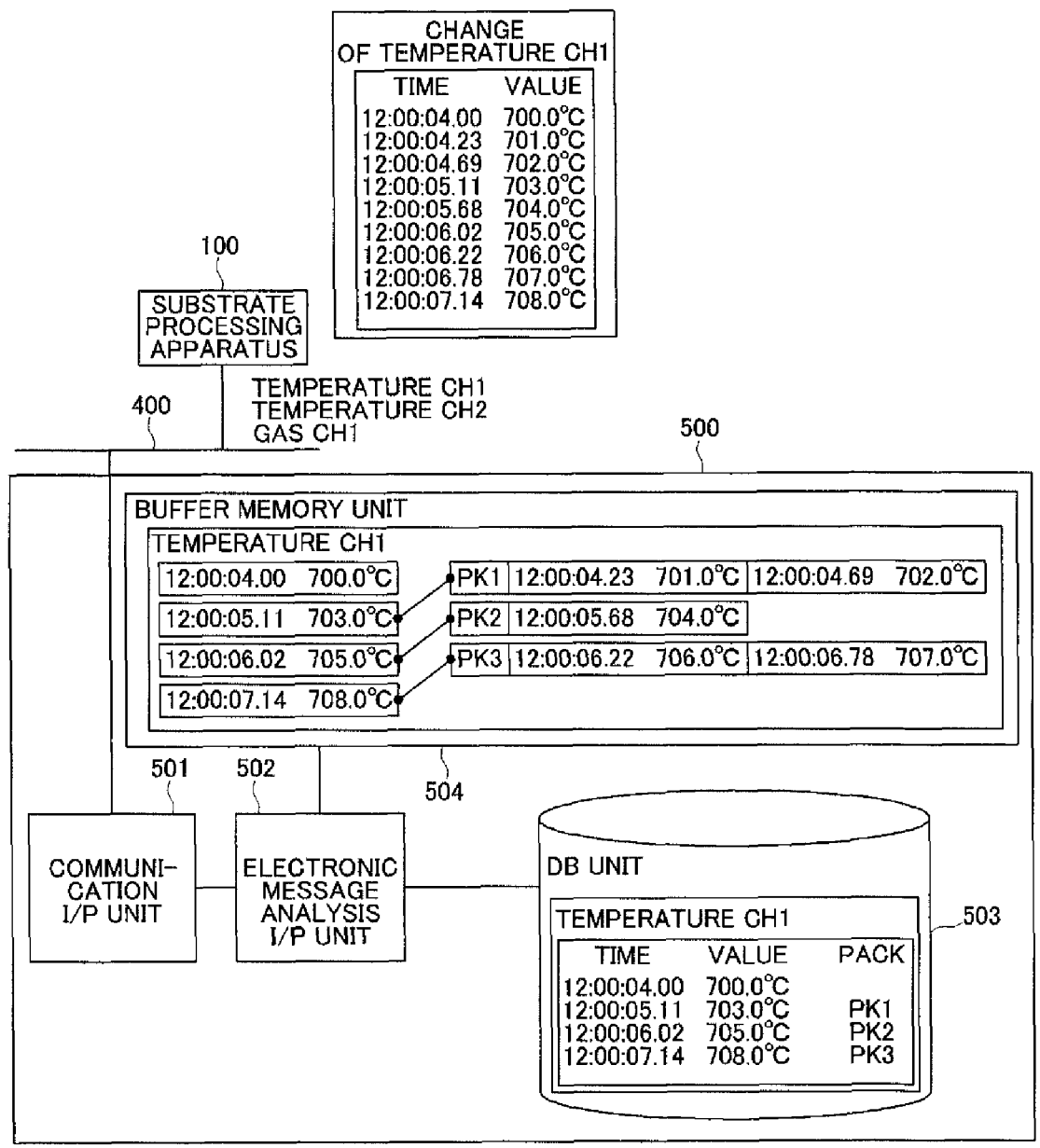
FIG. 13 is a schematic view exemplarily illustrating the case where the group management server receives the apparatus information and creates the pack information, and simultaneously, stores the apparatus information and the pack information in the DB unit, in accordance with an embodiment of the present invention.

FIG. 13 is a schematic view exemplarily illustrating the case where the group management server 500 receives the apparatus information and creates the pack information, and simultaneously, stores the apparatus information and the pack information in the DB unit 503. FIG. 16A to FIG. 16D are schematic views exemplarily illustrating the data manipulation within the buffer memory in accordance with this embodiment, specifically illustrating examples of the data manipulation when second to fifth monitor electronic messages are received.

In the group management server 500 shown in FIG. 13, the above-mentioned writing timing is repeated at a period of about 1.00 second. For example, when the electronic message is received immediately after the time information is repeated in order of second, the writing timing is set so that the writing of the apparatus information or the pack information to the DB unit 503 is executed. That is, when the time information read from the electronic message received at the previous time (time information stored in the current value retaining memory of FIG. 16A) is compared with the time information read from the latest electronic message, the received latest electronic message is determined as the electronic message prior to the writing timing if they coincide with each other in unit of second (if they coincide with each other when time below ¹⁄₁₀ second is chopped), and the received latest electronic message is determined as the electronic message after the writing timing if they do not coincide with each other (the current time is after 1 second).

As shown in FIG. 13, the substrate processing apparatus 100 generates nine pieces of apparatus information between 12:00:04.00 and 12:00:07.14, and the electronic message is transmitted nine times from the substrate processing apparatus 100 to the group management server 500.

Figure 16A:
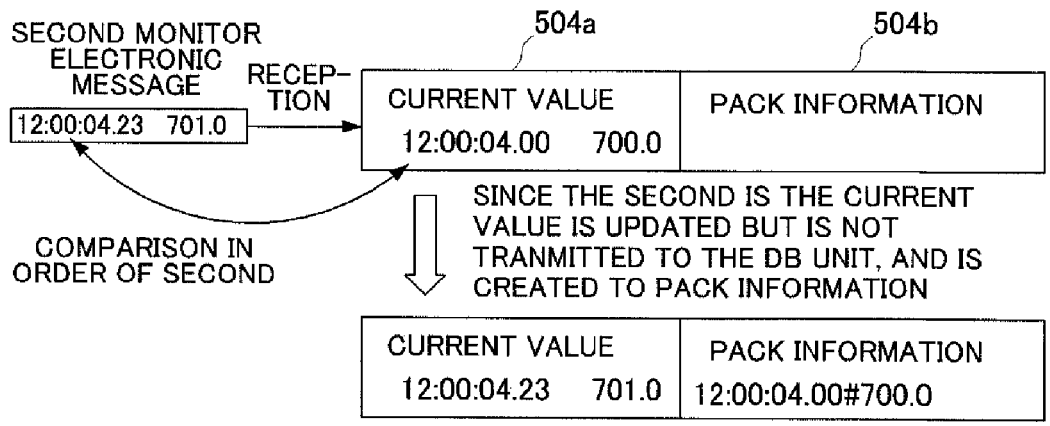
FIG. 16A to FIG. 16D are schematic views exemplarily illustrating the data manipulation within the buffer memory in accordance with an embodiment of the present invention, specifically illustrating examples of the data manipulation when second to fifth monitor electronic messages are received.

The electronic message analysis unit 502 which has received the electronic message (first electronic message) having the time information of 12:00:04.00 transmits the apparatus information (700.0° C.) and the time information (12:00:04.00) extracted from the electronic message to the DB unit 503. Furthermore, since the pack information is not created within the buffer memory unit 504 at this time point, the electronic message analysis unit 502 transmits only the apparatus information and the time information to the DB unit 503, without attaching the pack information. Moreover, as shown in FIG. 13, the apparatus information (700.0° C.) and the time information (12:00:04.00) are stored in the DB unit 503, with correlated to each other. In addition, as shown in FIG. 16A, the apparatus information (700.0° C.) and the time information (12:00:04.00) extracted from the first electronic message are stored in the first area 504a (current value field) of the buffer memory unit 504.

Figure 16B:
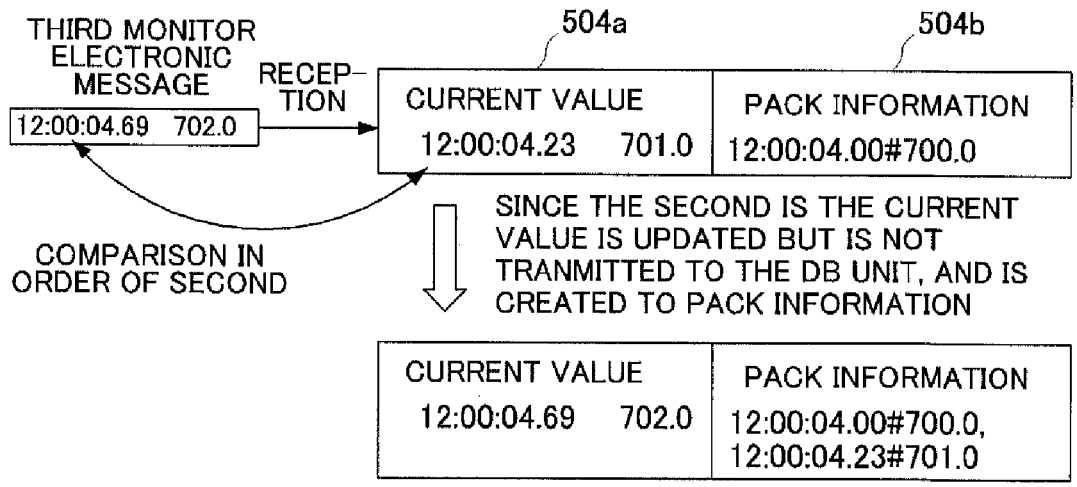

Then, the electronic message analysis unit 502 which has received the electronic messages (12:00:04.23 (second electronic message)~12:00:04.69 (third electronic message)) where the time information is prior to 12:00:05.00 sequentially transmits the apparatus information and the time information read from the electronic messages to the buffer memory unit 504, and creates the pack information PK1 within the buffer memory unit 504. Such a state is illustrated in FIG. 16A and FIG. 16B. The electronic message analysis unit 502 compares the time information read from the electronic message received at the previous time (time information stored in the current value retaining memory) with the time information read from the latest electronic message. The received latest electronic message is determined as the electronic message prior to the writing timing because they coincide with each other in unit of second (they coincide with each other when time below ¹⁄₁₀ second is chopped), and then sequentially transmitted to the buffer memory unit 504. The buffer memory unit 504 again creates the pack information by adding the previous apparatus information and time information stored in the first area 504a (current value field) to the end of the pack information, and simultaneously, stores the transmitted latest apparatus information and time information in the first area 504a (current value field).

Figure 16C:
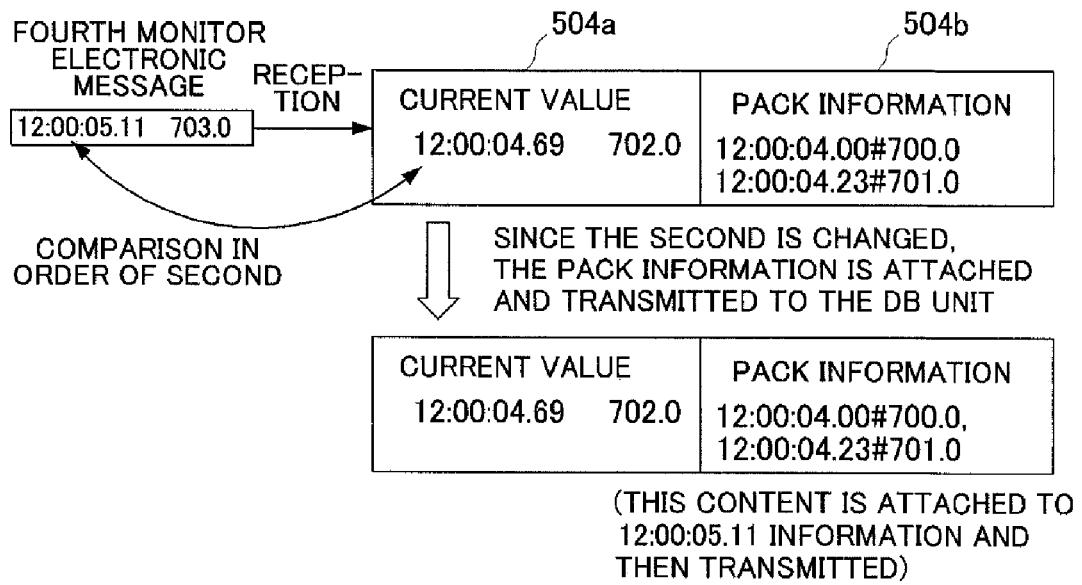
Figure 16D:
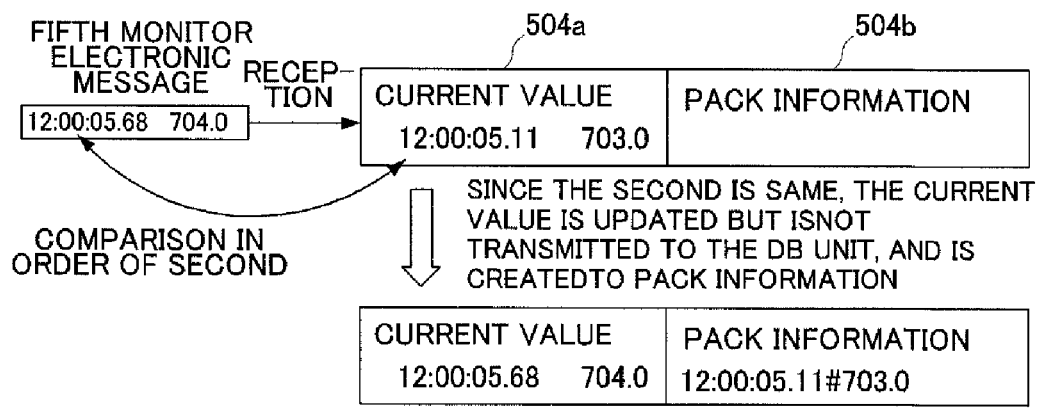

Then, the electronic message analysis unit 502 which has received the electronic message (12:00:05.11 (fourth electronic message)) where the time information is after 12:00: 05.00 (after the writing timing) compares the time information read from the electronic message received at the previous time (time information stored in the first area 504a (current value field) of FIG. 16C) with the time information read from the latest electronic message. Since they do not coincide with each other (since this time is after 1 second), the electronic message analysis unit 502 determines that the received latest electronic message is the electronic message after the writing timing). Then, the electronic message analysis unit 502 reads the pack information PK1 from the buffer memory unit 504, attaches it to the latest apparatus information (703.0° C.), and transmits and stores it to the DB unit 503 together with the time information (12:00:05.11). The apparatus information (703.0° C.), the time information (12:00:05.11), and the pack information PK1 are stored in the DB unit 503, with correlated to each other. Moreover, the electronic message analysis unit 502 transmits the apparatus information and the time information read from the latest electronic message to the buffer memory unit 504. In the buffer memory unit 504, the received latest apparatus information and time information are stored in the first area 504a.

Thereafter, in the same manner, the electronic message analysis unit 502 which has received the electronic message (12:00:05.68 (fifth electronic message)) where the time information is prior to 12:00:06.00 (prior to the writing period) sequentially transmits the apparatus information and the time information read from the electronic message to the buffer memory unit 504, and creates the pack information PK2 within the buffer memory unit 504.

Then, in the same manner, the electronic message analysis unit 502 which has received the electronic message (12:00: 06.02 (sixth electronic message)) where the time information is after 12:00:06.00 (after the writing timing) reads the pack information PK2 from the buffer memory unit 504, attaches it to the latest apparatus information (705.0° C.), and transmits and stores it to the DB unit 503 together with the time information (12:00:06.02). The apparatus information (705.0° C.), the time information (12:00:06.02), and the pack information PK2 are stored in the DB unit 503, with correlated to each other.

In the same manner, the electronic message analysis unit 502 which has received the electronic messages (12:00:06.22 (seventh electronic message)~12:00:06.78 (eighth electronic message)) where the time information is prior to 12:00:07.00 (prior to the writing period) sequentially transmits the apparatus information and the time information read from the electronic messages to the buffer memory unit 504, and creates the pack information PK3 within the buffer memory unit 504.

Then, the electronic message analysis unit 502 which has received the electronic message (12:00:07.14 (ninth electronic message)) where the time information is after 12:00: 07.00 (after the writing timing) reads the pack information PK3 from the buffer memory unit 504, attaches it to the latest apparatus information (708.0° C.), and transmits and stores it to the DB unit 503 together with the time information (12:00: 07.14). The apparatus information (708.0° C.), the time information (12:00:07.14), and the pack information PK3 are stored in the DB unit 503, with correlated to each other.

It can be seen from FIG. 13 that although the electronic message is transmitted nine times from the substrate processing apparatus 100, the storing times of the information in the DB unit 503 is reduced to four times, and the load of the group management server 500 is reduced.

(Upon Reception of Reading Request Message)

Figure 20:
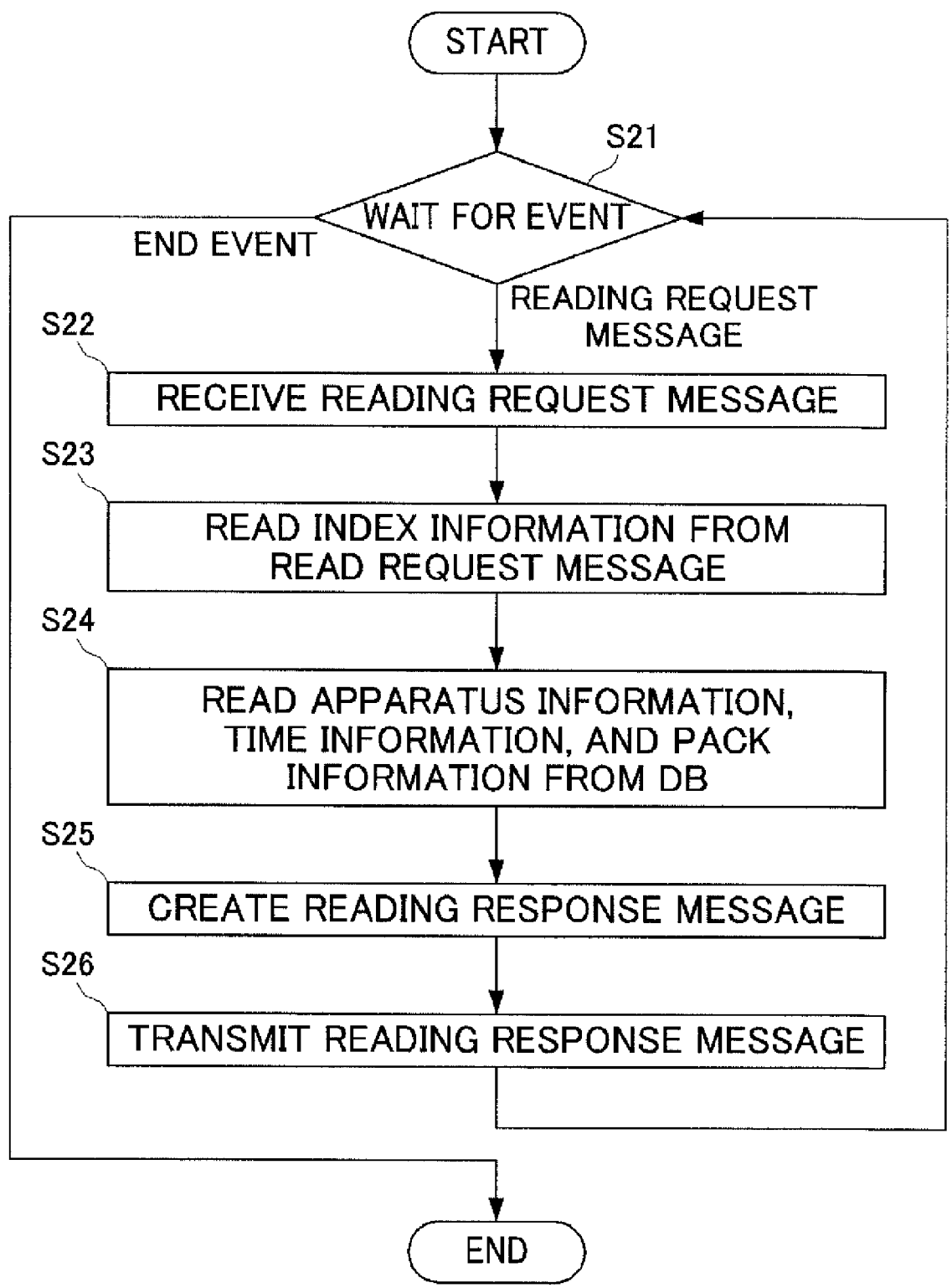
FIG. 20 is a flowchart illustrating the operation of the group management server when the reading request message is transmitted from the manipulation terminal, in accordance with an embodiment of the present invention.

Next, the operation of the group management server 500 when the reading request message is transmitted from the manipulation terminal 700 will be described with reference to FIG. 20. FIG. 20 is a flowchart illustrating the operation of the group management server in accordance with this embodiment when the reading request message is transmitted from the manipulation terminal.

In the same manner as above, after the group management program runs, the group management server 500 waits for the event until a predetermined end event such as termination manipulation occurs (S21).

If the reading request message is transmitted from the manipulation terminal 700, the communication I/F unit 501 receives the reading request message from the manipulation terminal 700 through the network 600, and transmits the received reading request message to the electronic message analysis unit 502 (S22).

The electronic message analysis unit 502 receives the reading request message from the communication I/F unit 501, and reads the index information, which specifies the apparatus information to be read, from the reading request message (S23).

Then, the electronic message analysis unit 502 transmits the read index information to the DB unit 503. If the index information is read from the electronic message analysis unit 502, the apparatus information, the time information of the apparatus information, and the pack information attached to the pack information, which are correlated by the index information, are read from the DB unit 503, and then are transmitted to the electronic message analysis unit 502 (S24). Furthermore, the reading from the DB unit 503 can be executed in unit of pack information. Moreover, only the apparatus information and the time information (that is, only information around the writing timing) which are not contained in the pack information can be read.

The electronic message analysis unit 502 receives the apparatus information, the time information attached to the apparatus information, and the pack information attached to the apparatus information from the DB unit 503, creates the reading response message containing them, and transmits it to the communication I/F unit 501 (S25).

The communication I/F unit 501 receives the reading response message from the electronic message analysis unit 502, and transmits it to the manipulation terminal 700 (S26). Thereafter, the group management server 500 returns to the state (S21) of waiting for the above-mentioned event.

(Effects in Accordance with the Embodiment of the Present Invention)

In accordance with this embodiment, one or more of the following effects can be obtained.

In accordance with this embodiment, if the time information read from the electronic message is earlier than the writing timing which is repeated at a predetermined period, the electronic message analysis unit 502 transmits the apparatus information to the buffer memory unit 504 and adds it to the pack information, and, if the read time is later than the writing timing, the electronic message analysis unit 502 reads the pack information from the buffer memory unit 504, attaches it to the apparatus information, and transmits the apparatus information, to which the pack information is attached, to the DB unit 503. Therefore, the frequency of the writing process by the DB unit 503 is reduced, and the load of the group management server 500 is reduced. That is, even though the transmission interval of the electronic message from the substrate processing apparatus 100 to the group management server 500 is shortened, the load of the group management server 500 can be reduced because the frequency of the writing to the DB unit 503 is reduced in the group management server. For example, according to the explanation with reference to FIG. 13, it can be seen that although the electronic message is transmitted nine times from the substrate processing apparatus 100, the storing times of the information in the DB unit 503 is reduced to four times, and the frequency of the writing to the DB unit 503 is reduced, so that the load of the group management server 500 is reduced.

Figure 17:
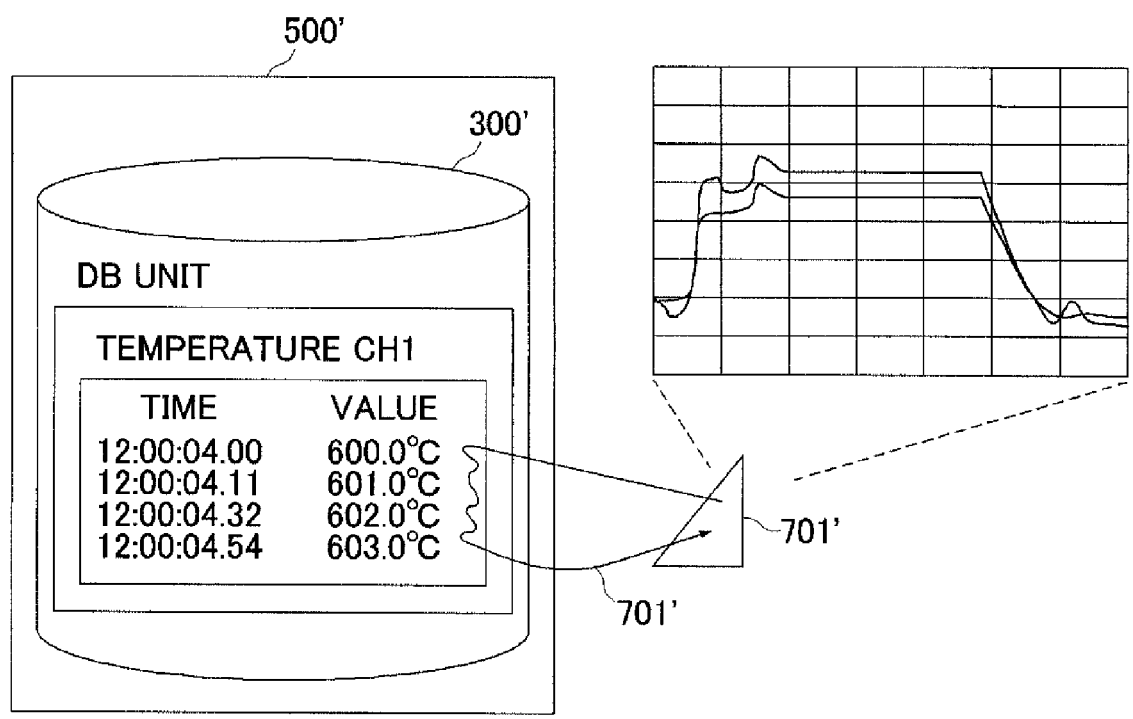
FIG. 17 is a schematic view illustrating the DB reading operation of the conventional group management server.
Figure 18:
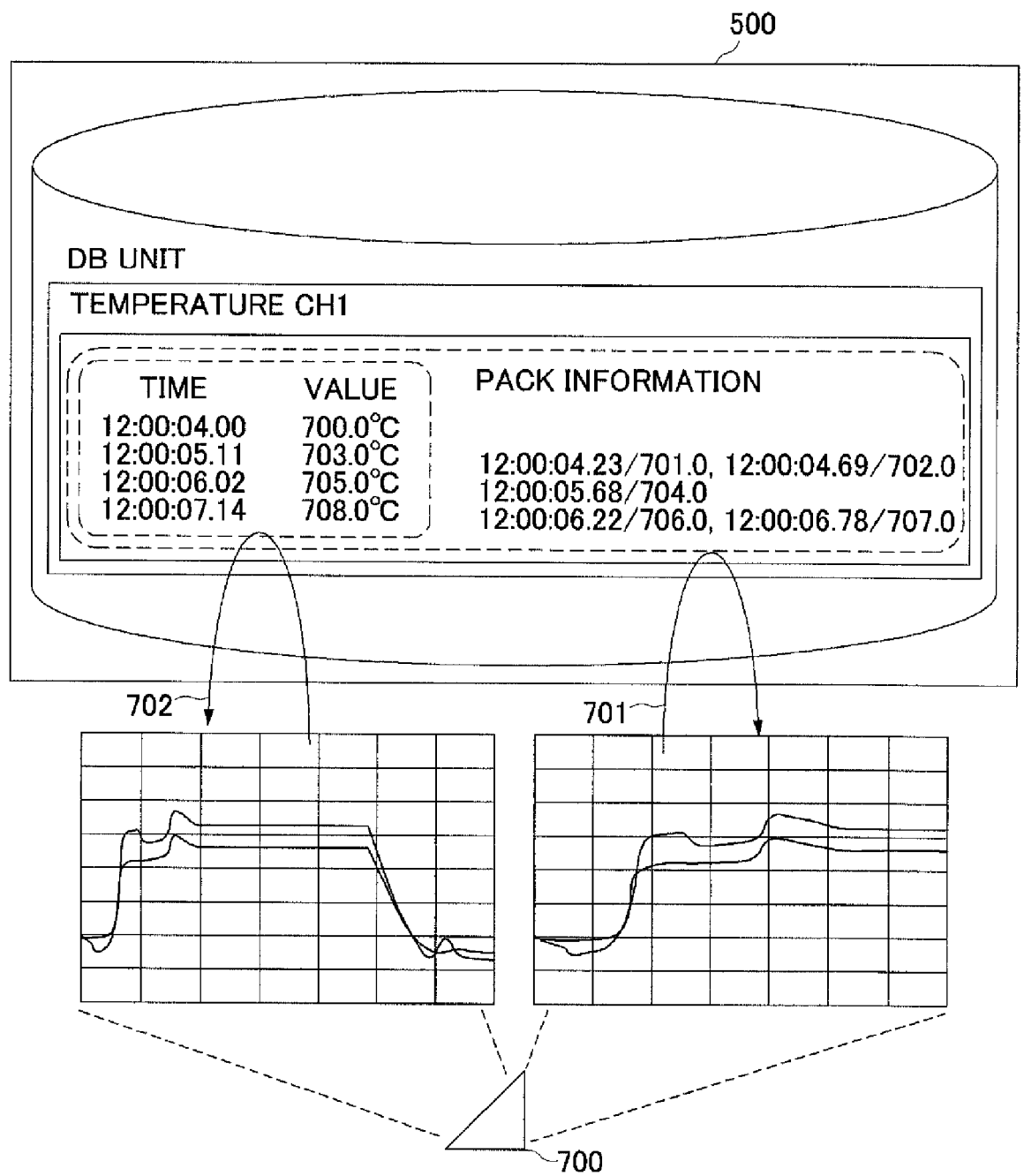
FIG. 18 is a schematic view illustrating the DB reading operation of the group management server in accordance with an embodiment of the present invention.

In addition, in accordance with this embodiment, the reading from the DB unit 503 can be executed in batch in unit of the pack information. As a result, the load of the group management server can be reduced by decreasing the frequency of the reading from the DB unit 503. FIG. 17 is a schematic view illustrating the DB reading operation of the conventional group management server 500', and FIG. 18 is a schematic view illustrating the DB reading operation of the group management server 500 in accordance with this embodiment. In the conventional substrate processing system shown in FIG. 17, the process of the reading from the DB unit 503' needs to be repetitively performed as many as the number of entries of the apparatus information (four times) according to the reading request message from the manipulation terminal 700' (reference numeral 701'). On the contrary, in the substrate processing system shown in FIG. 18 in accordance with this embodiment, the process of the reading from the DB unit 503 need not be repetitively performed as many as the number of entries of the apparatus information (batch processing is possible as indicated by a reference numeral 701), so that the load of the group management server 500 is reduced.

Moreover, in accordance with this embodiment, only the apparatus information and the time information which are not contained in the pack information (only information around the writing timing) can be read. Such a state is indicated by a reference numeral 702 in FIG. 18. Therefore, the sampling operation of the graph 704 need not be performed in the manipulation terminal 700 in order for easily monitoring the change of the substrate processing apparatus 100, and thus, the load of the manipulation terminal 700 can be reduced.

The substrate processing apparatus 10 relevant to the present invention can be applied to an apparatus for processing a glass substrate of an LCD device or the like as well as a semiconductor manufacturing apparatus. Furthermore, the substrate processing apparatus 10 relevant to the present invention is applied to an exposure apparatus, a coating apparatus, a drying apparatus, a heating apparatus, or the like. Moreover, the substrate processing apparatus 10 relevant to the present invention is not limited to the processing inside the furnace, but can be used to perform film-forming processes such as CVD, PVD, an oxide or nitride film formation, and a metal-containing film formation.

In accordance with the present invention, the search time can be reduced when the terminal device acquires the information from the information managing apparatus. Furthermore, by using a variety of information generated when the substrate processing apparatus processes the substrate, it is possible to reduce time necessary for data analysis (for example, abnormality factor search generated in the substrate processing apparatus) and data processing (for example, the graphic representation of production information transmitted from the substrate processing apparatus).

Moreover, the present invention also includes the following embodiments.

The information managing apparatus relevant to the present invention comprises: a first apparatus information storage unit storing apparatus information of a substrate processing apparatus at a transmission time of an electronic message, based upon the electronic message transmitted from the substrate processing apparatus; a second apparatus storage unit storing the apparatus information in association with time; a condition storage unit storing conditions for setting the moving apparatus information and accumulating the apparatus information; and a registration unit registering time when the conditions stored in the condition storage unit are satisfied in the second apparatus information storage unit, in association with the apparatus information coinciding with the setting stored in the first apparatus information storage unit.

The first substrate processing system relevant to the present invention comprises: a plurality of substrate processing apparatuses; an information managing apparatus processing an electronic message transmitted from the substrate processing apparatuses; and a terminal device connected to the information managing apparatus, wherein the substrate processing apparatus comprises a transmission unit transmitting the electronic message containing apparatus information or event information to the information managing apparatus; and the information managing apparatus comprises: a first apparatus information storage unit storing the apparatus information of the substrate processing apparatus at a transmission time of the electronic message, based upon the electronic message transmitted from the transmission unit; a second apparatus information storage unit storing the apparatus information in association with time; a condition storage unit storing conditions for setting the moving apparatus information and accumulating the apparatus information; and a registration unit registering time when the conditions stored in the condition storage unit are satisfied in the second apparatus information storage unit, in association with the apparatus information coinciding with the setting stored in the first apparatus information storage unit, and the terminal device comprises a search unit searching the apparatus information stored in the second apparatus information storage unit.

The second substrate processing system relevant to the present invention further comprises a display unit installed in the terminal device of the first substrate processing system, and displays the apparatus information on the display unit when the stored apparatus information coincides with the contents of the condition storage unit, by referring to the apparatus information stored in the condition storage unit and the second apparatus information storage unit.

In the third substrate processing system relevant to the present invention, the substrate processing apparatus of the first substrate processing system further comprises: a search unit searching the apparatus information accumulated in the second apparatus information storage unit; and a display unit displaying the apparatus information searched by the search unit.

In the first data searching method relevant to the present invention, the latest data transmitted from the apparatus is stored in the first storage unit. If the preset data is received, at least a part of the data stored in the first storage unit is added to the time when the predetermined data has been generated, and then accumulated in the second storage unit. Thereafter, the accumulated data are searched.

In the second data searching method relevant to the present invention, the latest data transmitted from the apparatus is stored in the first storage unit. The predetermined data and parameters setting the data to be moved to the second storage unit only when the predetermined data is generated are referenced. If the predetermined data is received, at least a part of the data stored in the first storage unit are accumulated in the second storage unit, and the accumulated data are searched.

The first data searching system relevant to the present invention comprises: a first storage unit overwriting the data transmitted from the processing apparatus; a second storage unit accumulating the stored data of the first storage unit in response to the predetermined data and parameters setting the data to be moved to the second storage unit only when the predetermined data is generated; and a terminal unit searching the accumulated data.

The second data searching system relevant to the present invention further comprises a display unit installed in the terminal unit of the first data searching system. The parameters and the accumulated data are searched, and the data are displayed on the display unit when the accumulated data coincide with the contents of the parameters.

In the third data searching system relevant to the present invention, the processing apparatus of the first data searching system comprises: a searching unit searching the data accumulated in the second storage unit; and a display unit displaying the data searched by the searching unit.

(Supplementary Note)
The present invention further includes the following embodiments.

(Supplementary Note 1)
According to an embodiment of the present invention, there is provided an information managing method for managing information, based upon an electronic message containing apparatus information or event information transmitted from a substrate processing apparatus, the information managing method comprising: storing the apparatus information of the substrate processing apparatus at the transmission time of the electronic message containing the apparatus information in a first apparatus information storage unit; when the electronic message containing the event information is transmitted, comparing conditions for accumulating the event information and the apparatus information; and when the conditions coincide with each other, storing the apparatus information in a second apparatus information storage unit in association with time when the event information has been generated.

(Supplementary Note 2)
In the information managing method of Supplementary Note 1, when the electronic message containing the event information is transmitted, a moving condition for moving the event information and the apparatus information stored in the first apparatus information storage unit to the second apparatus information storage unit is compared with a condition storage unit in which the apparatus information being a moving target is set; when the event information coincides with the condition, the generation time of the event information is added to the apparatus information being the set moving target as the apparatus information stored in the first apparatus information storage unit; and the resulting information is stored in the second apparatus information unit.

(Supplementary Note 3)
According to another embodiment of the present invention, there is provided an information displaying method for displaying information on a manipulation terminal having a manipulation screen, wherein when an electronic message containing event information is transmitted from a substrate processing apparatus, the manipulation terminal searches a second apparatus information storage unit storing a set moving target apparatus information to which a generation time of the event information is added, by referring to the moving condition for moving the event information and apparatus information stored in a first apparatus information storage unit to the second apparatus information storage unit and a condition storage unit in which the apparatus information being a moving target is set; the manipulation terminal compares the search result information with the set apparatus information; and when the search result information coincides with the set apparatus information, the apparatus information is displayed on the manipulation screen.

(Supplementary Note 4)
According to another embodiment of the present invention, there is provided an information managing apparatus comprising: a first apparatus information storage unit storing apparatus information of a substrate processing apparatus at time when an electronic message has been transmitted, base upon the electronic message transmitted from the substrate processing apparatus; a second apparatus information storage unit storing the apparatus information in association with time; a condition storage unit storing conditions for setting the moving apparatus information and accumulating the apparatus information; and a registration unit registering time when the conditions stored in the condition storage unit are satisfied in the second apparatus information storage unit, in association with the apparatus information coinciding with the setting stored in the first apparatus information storage unit.

(Supplementary Note 5)

According to another embodiment of the present invention, there is provided a substrate processing system comprising: a plurality of substrate processing apparatuses; and an information managing apparatus processing an electronic message transmitted from the substrate processing apparatuses, wherein the substrate processing apparatus comprises a transmission unit transmitting the electronic message containing apparatus information or event information to the information managing apparatus, and the information managing apparatus comprises: a first apparatus information storage unit storing the apparatus information of the substrate processing apparatus at a transmission time of the electronic message, based upon the electronic message transmitted from the transmission unit; a second apparatus information storage unit storing the apparatus information in association with time; a condition storage unit storing conditions for setting the moving apparatus information and accumulating the apparatus information; and a registration unit registering time when the conditions stored in the condition storage unit are satisfied in the second apparatus information storage unit, in association with the apparatus information coinciding with the setting stored in the first apparatus information storage unit.

(Supplementary Note 6)

According to another embodiment of the present invention, there is provided a substrate processing system comprising: a plurality of substrate processing apparatuses; an information managing apparatus processing an electronic message transmitted from the substrate processing apparatuses; and a terminal device connected to the information managing apparatus, wherein the substrate processing apparatus comprises a transmission unit transmitting the electronic message containing apparatus information or event information to the information managing apparatus, the information managing apparatus comprises: a first apparatus information storage unit storing the apparatus information of the substrate processing apparatus at a transmission time of the electronic message, based upon the electronic message transmitted from the transmission unit; a second apparatus information storage unit storing the apparatus information in association with time; a condition storage unit storing conditions for setting the moving apparatus information and accumulating the apparatus information; and a registration unit registering time when the conditions stored in the condition storage unit are satisfied in the second apparatus information storage unit, in association with the apparatus information coinciding with the setting stored in the first apparatus information storage unit, and the terminal device comprises a search unit searching the apparatus information stored in the second apparatus information storage unit.

(Supplementary Note 7)

In the substrate processing system of Supplementary Note 5 or 6, the substrate processing apparatus comprises: a search unit searching the apparatus information accumulated in the second apparatus information storage unit; and a display unit displaying the apparatus information searched by the search unit.

(Supplementary Note 8)

According to another embodiment of the present invention, there is provided a substrate processing apparatus of the substrate processing system of any one of Supplementary notes 5 to 7.

(Supplementary Note 9)

In the substrate processing system of Supplementary Note 6, the terminal device further comprises a display unit, and the terminal device refers to the apparatus information stored in the condition storage unit and the second apparatus information storage unit, and displays the apparatus information when the stored apparatus information coincides with contents of the condition storage unit.

(Supplementary Note 10)

A substrate processing system comprises: one or more substrate processing apparatuses; and a group management server collecting apparatus information from the substrate processing apparatuses, wherein the group management server comprises: a communication unit receiving the apparatus information; an electronic message analysis unit receiving the apparatus information from the communication unit to read time information added to the apparatus information; a temporary storage unit temporarily accumulating the apparatus information received from the electronic message analysis unit and creating pack information; and a storage unit receiving the apparatus information, to which the pack information is attached, from the electronic message analysis unit, wherein, if the read time is earlier than a writing timing which is repeated at a predetermined period, the electronic message analysis unit transmits the apparatus information to the temporary storage unit and adds the apparatus information to the pack information, and, if the read time is later than the writing timing, the electronic message analysis unit reads the pack information from the temporary storage unit, attaches the pack information to the apparatus information, and transmits the apparatus information, to which the pack information is attached, to the storage unit.

(Supplementary Note 11)

In the substrate processing system of Supplementary Note 10, the electronic message analysis unit compares the read time with a current time, and, if the difference between the read time and the current time is within a predetermined range, the electronic message analysis unit transmits the apparatus information to the temporary storage unit and adds the apparatus information to the pack information, and, if the difference between the read time and the current time is out of the predetermined range, the electronic message analysis unit reads the pack information from the temporary storage unit, attaches the pack information to the apparatus information, and transmits the apparatus information, to which the pack information is attached, to the storage unit.

(Supplementary Note 12)

In the substrate processing system of Supplementary Note 10, the transmission period of the apparatus information transmitted from the substrate processing apparatus is shorter than the repetition period of the writing timing.

(Supplementary Note 13)

In the substrate processing system of Supplementary Note 10, the writing timing is a timing where all the pack information accumulated in the temporary storage unit are transmitted to the storage unit.

(Supplementary Note 14)

According to another embodiment of the present invention, there is provided a substrate processing apparatus of the substrate processing system of any one of Supplementary Notes 10 to 13.

(Supplementary Note 15)

A group management server for collecting apparatus information from one or more substrate processing apparatuses comprises: a communication unit receiving the apparatus information; an electronic message analysis unit receiving the apparatus information from the communication unit to read time information added to the apparatus information; a temporary storage unit temporarily accumulating the apparatus information received from the electronic message analysis unit and creating pack information; and a storage unit receiving the apparatus information, to which the pack information is attached, from the electronic message analysis unit, wherein, if the read time is earlier than a writing timing which is repeated at a predetermined period, the electronic message analysis unit transmits the apparatus information to the temporary storage unit and adds the apparatus information to the pack information, and, if the read time is later than the writing timing, the electronic message analysis unit reads the pack information from the temporary storage unit, attaches the pack information to the apparatus information, and transmits the apparatus information, to which the pack information is attached, to the storage unit.

The invention claimed is:

1. An information managing apparatus comprising:
    a CPU;
    a first apparatus information storage unit storing apparatus information of a substrate processing apparatus based on an electronic message transmitted from the substrate processing apparatus for processing a substrate, the electronic message including at least one of the apparatus information and event information;
    a second apparatus information storage unit storing the apparatus information in association with a time stamp when the apparatus information or the event information is generated;
    a condition storage unit storing an accumulation condition for accumulating the apparatus information in the second apparatus information storage unit and the apparatus information to be accumulated; and
    a registration unit registering the apparatus information to be accumulated and the time stamp thereof associated with the apparatus information to be accumulated in the second apparatus information storage unit when the accumulation condition stored in the condition storage unit is satisfied.

2. A substrate processing system comprising:
    a plurality of substrate processing apparatuses; and
    an information managing apparatus processing an electronic message including at least one of apparatus information and event information transmitted from the plurality of substrate processing apparatuses, wherein the substrate processing apparatus comprises a transmission unit transmitting the electronic message to the information managing apparatus, and
    the information managing apparatus comprises:
    a first apparatus information storage unit storing the apparatus information based on the electronic message;
    a second apparatus information storage unit storing the apparatus information in association with a time stamp when the apparatus information or the event information is generated;
    a condition storage unit storing an accumulation condition for accumulating the apparatus information in the second apparatus information storage unit and the apparatus information to be accumulated; and
    a registration unit registering the apparatus information to be accumulated and the time stamp thereof associated with the apparatus information to be accumulated in the second apparatus information storage unit when the accumulation condition stored in the condition storage unit is satisfied.

3. The substrate processing system of claim 2, further comprising:
    a terminal device connected to the information managing apparatus, the terminal device comprising a search unit searching the apparatus information accumulated in the second apparatus information storage unit.

4. The substrate processing system of claim 2, wherein the substrate processing apparatus comprises:
    a search unit searching the apparatus information accumulated in the second apparatus information storage unit; and
    a display unit displaying the apparatus information searched by the search unit.

5. A substrate processing apparatus of the substrate processing system according to claims 2-4.

6. The substrate processing system of claim 3, wherein the terminal device further comprises a display unit displaying the apparatus information stored in the second apparatus information storage unit when the accumulation condition stored in the condition storage unit is satisfied.

* * * * *